US012656463B2

(12) United States Patent
Fang et al.

(10) Patent No.: US 12,656,463 B2
(45) Date of Patent: Jun. 16, 2026

(54) IMAGE SENSOR FOR TIME-OF-FLIGHT SYSTEM

(71) Applicant: Taiwan Semiconductor Manufacturing Company Limited, Hsinchu (TW)

(72) Inventors: Yeh-Hsun Fang, Taipei City (TW); Zhi-Wei Zhuang, Hsinchu (TW); Li-Hsin Chu, New Taipei City (TW)

(73) Assignee: Taiwan Semiconductor Manufacturing Company Limited, Hsinchu (TW)

( * ) Notice: Subject to any disclaimer, the term of this patent is extended or adjusted under 35 U.S.C. 154(b) by 1237 days.

(21) Appl. No.: 17/459,382

(22) Filed: Aug. 27, 2021

(65) Prior Publication Data

US 2023/0065710 A1 Mar. 2, 2023

(51) Int. Cl.
*G01S 7/4861* (2020.01)
*G01S 7/4865* (2020.01)
*G01S 17/08* (2006.01)

(52) U.S. Cl.
CPC .......... *G01S 7/4865* (2013.01); *G01S 7/4861* (2013.01); *G01S 17/08* (2013.01)

(58) Field of Classification Search
CPC ...... G01S 7/4865; G01S 7/4861; G01S 17/08; G01S 7/4816; G01S 7/4863; G01S 7/497; G01S 17/894; G01S 17/10; H01L 25/167
See application file for complete search history.

(56) References Cited

U.S. PATENT DOCUMENTS

| | | | | |
|---|---|---|---|---|
| 2012/0261733 | A1* | 10/2012 | Oyu .................. | H10D 84/0151 |
| | | | | 257/296 |
| 2018/0233521 | A1* | 8/2018 | Na ........................ | H10F 39/809 |
| 2018/0350853 | A1* | 12/2018 | Huang ................. | H10F 39/199 |
| 2021/0270946 | A1* | 9/2021 | Miguel Sánchez ..... | G01S 17/36 |
| 2021/0320217 | A1* | 10/2021 | Levy .................... | H10F 77/147 |

* cited by examiner

*Primary Examiner* — William B Partridge
*Assistant Examiner* — Erik A. Anderson
(74) *Attorney, Agent, or Firm* — The Marbury Law Group, PLLC

(57) ABSTRACT

An image sensor for a Time-of-Flight imaging system is disclosed that includes at least one primary sensor having a photodetector that includes a photovoltaic junction formed at least partially in a germanium-containing material that includes germanium at an atomic percentage greater than 50%, and at least one secondary sensor having a photodetector that includes a photovoltaic junction formed in a second material, such as a silicon-containing material, that includes germanium at an atomic percentage between 0% and 50%. The primary sensor may detect Time-of-Flight measurement signals and the secondary sensor may detect background light, such as sunlight, to correct for background light interference.

20 Claims, 27 Drawing Sheets

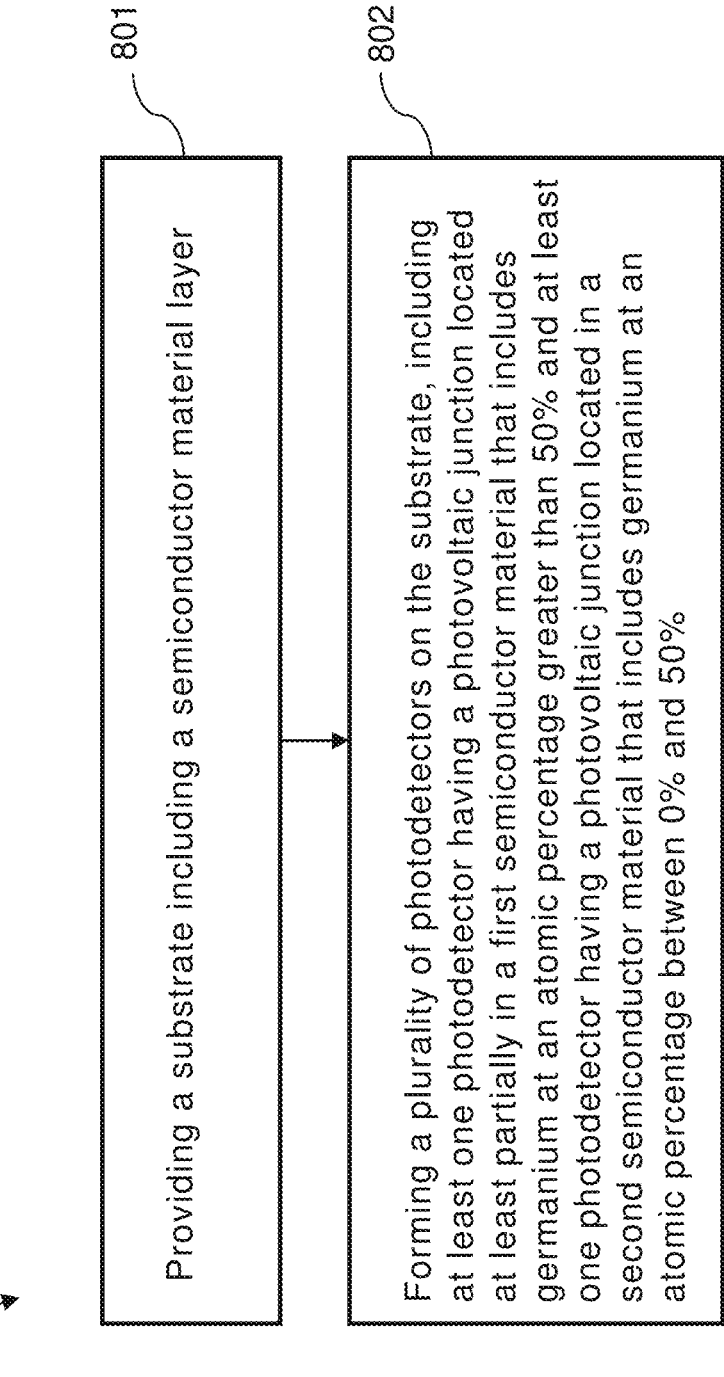

801

Providing a substrate including a semiconductor material layer

802

Forming a plurality of photodetectors on the substrate, including at least one photodetector having a photovoltaic junction located at least partially in a first semiconductor material that includes germanium at an atomic percentage greater than 50% and at least one photodetector having a photovoltaic junction located in a second semiconductor material that includes germanium at an atomic percentage between 0% and 50%

IMAGE SENSOR FOR TIME-OF-FLIGHT SYSTEM

BACKGROUND

A time-of-flight (ToF) system uses a light source and an image sensor to determine distances between the camera and one or more objects within the field-of-view of the image sensor. A ToF system operates by emitting a light pulse to illuminate a scene and measuring the round-trip return time of the light reflected back to the image sensor. The depth of various points in the image obtained by the image sensor is determined using time-of-flight techniques. Unlike scanning range imaging systems, such as LIDAR, a ToF system is able to extract depth information from a scene in a single shot. ToF systems can also operate at relatively high frequencies, making them well-suited for real-time range finding and depth mapping applications.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 8 is a flow chart of a method for fabricating an image sensor for a ToF system in accordance with some embodiments.

DETAILED DESCRIPTION

Figure 1A:
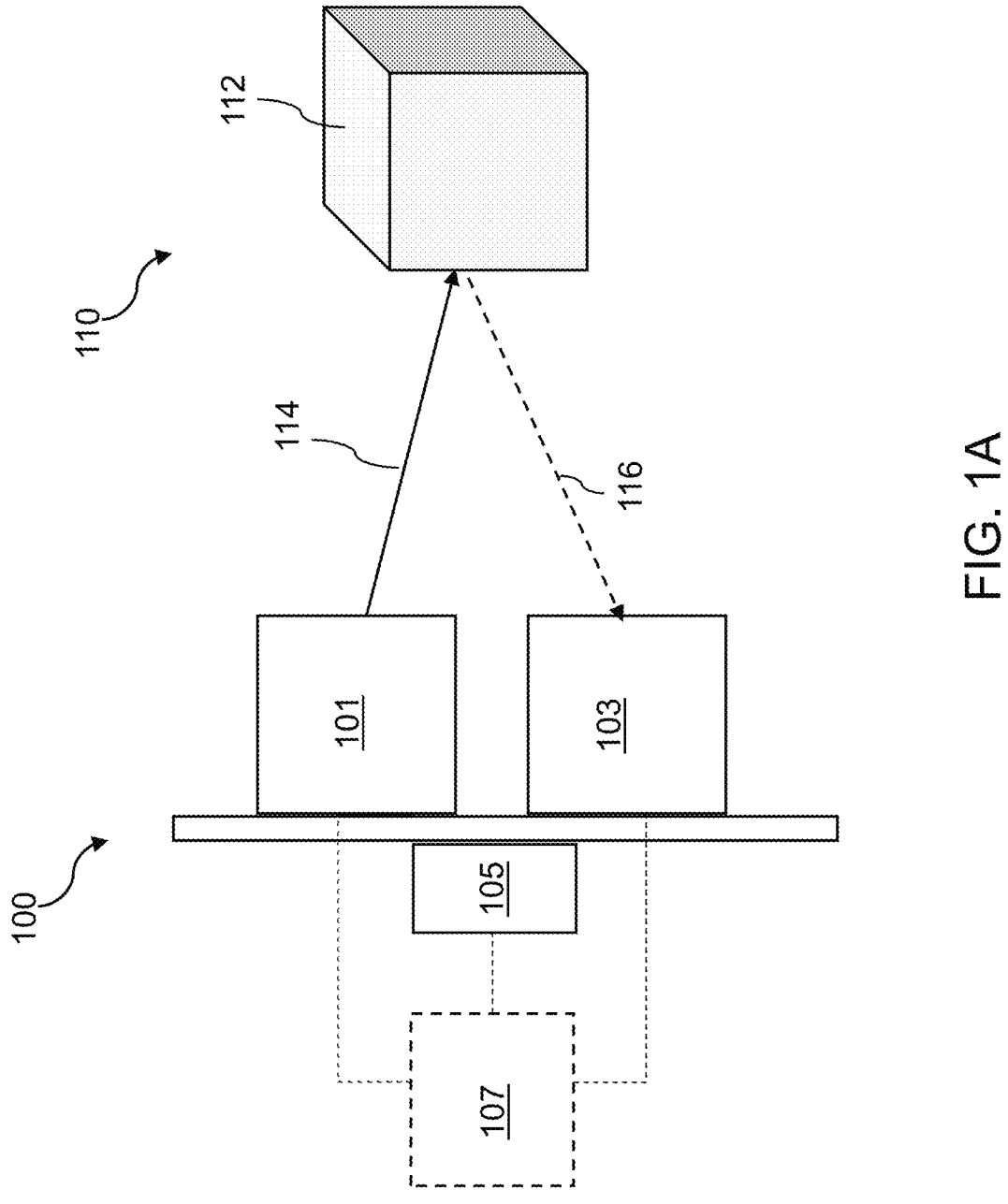
FIG. 1A is a schematic illustration of a Time-of-Flight (ToF) imaging system in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Generally, the systems and methods of the present disclosure relate to Time-of-Flight (ToF) imaging systems, and in particular to image sensors that may be utilized for Time-of-Flight imaging systems. A ToF system may determine distances between the camera and one or more objects within the field-of-view of the image sensor by using a light source and an image sensor. A ToF system may emit a light pulse through its light source to illuminate a scene. The ToF image sensor may detect the light reflected back to the image sensor. The round-trip return time of the emitted light from the light source and detected reflected light may be measured. The depth of various points in the image obtained by the image sensor may be determined using time-of-flight techniques. Unlike scanning range imaging systems, such as LIDAR, a ToF system is able to extract depth information from a scene in a single shot. ToF systems can also operate at relatively high frequencies, making them well-suited for real-time range finding and depth mapping applications.

A typical ToF system includes an illumination source, such as a laser or LED light source, and a semiconductor image sensor, such as a complementary metal-oxide semiconductor (CMOS) image sensor (CIS) or a charge-coupled device (CCD) sensor. The illumination source normally emits light in the infrared (IR) range so as to be unobtrusive to observers. The image sensor utilizes an array of sensor elements (i.e., pixel elements), which may include photodetectors and transistors, that absorb the reflected radiation and convert the sensed radiation into electrical signals. A known drawback to current ToF systems is that they are prone to interference from ambient light, particularly sunlight, which can negatively impact performance in outdoor environments. Various embodiments are disclosed herein to mitigate the negative effects due to outdoor usage in sunlight.

Referring to FIG. 1A, an example of a Time-of-Flight imaging system 100 is schematically illustrated. In general, the system 100 may include an illumination unit 101 and an image sensor 103. The illumination unit 101 may be a laser or LED light source and may emit light in the infrared (IR) wavelength range. The image sensor 103 may be a semiconductor image sensor, such as a complementary metal-oxide-semiconductor (CMOS) image sensor (CIS) or a charge-coupled device (CCD) sensor. The image sensor 103 may include an array of image pixels (which may include photodetectors and transistors) to detect radiation (reflected or direct) using photogeneration of electron-hole pairs. The image sensor 103 may also include optical elements, such as one or more lenses to focus reflected light to the focal plane of the sensor array. The image sensor 103 may also include optical filter(s) that are configured pass light in the operating wavelength range of the illumination unit 101 while suppressing light from outside this range.

The system 100 may also include control circuitry 105 that may be operatively coupled the illumination unit 101 and the image sensor 103. The control circuitry 105 may control and synchronize the operation of the illumination unit 101 and the image sensor 103. The system 100 may additionally include a processor 107 that may process the image data received by the image sensor 103 to determine distance information.

The ToF system 100 may operate by illuminating a scene 110 using artificial light 114 from the illumination unit 101, and detecting reflected light 116 that is reflected off of one or more objects 112 in the scene 110 and detected at the image sensor 103. The ToF system 100 may calculate the distance between the image sensor 103 and various points within the scene 110 using image data collected by the image sensor 103. To calculate distance information, the system 100 may utilize a direct time-of-flight technique in which the system 100 directly measures the time it takes for light to leave the illumination unit 101 and reflect back to each pixel of the image sensor 103. This may enable depth information for a full 3D scene to be captured with a single light pulse.

Alternatively, a ToF system 100 may utilize an indirect time-of-flight measurement technique, such as a phase detection technique in which the light emitted from the illumination source 101 may be modulated by a periodic reference signal, and the image sensor 103 may detect the phase shift of the reference signal in the reflected light 116 to determine distance information.

Figure 1B:
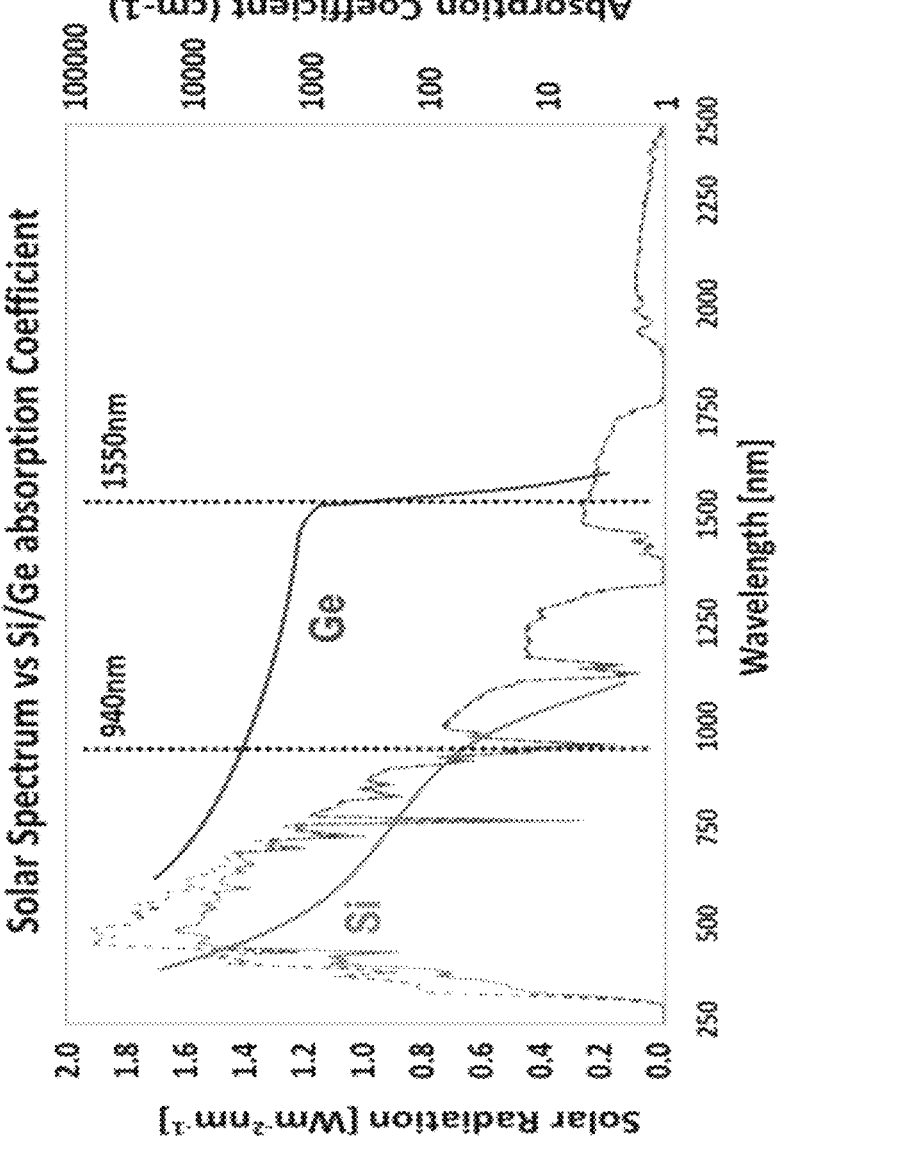
FIG. 1B is a plot showing the absorption coefficients for germanium and silicon and the spectral composition of solar radiation over a portion of the electromagnetic spectrum.

ToF systems 100 typically utilize IR light, which may be less sensitive to interference from ambient light in the visible range. Additionally, because IR light is invisible to the human eye, the use of IR light may make the ToF system 100 unobtrusive to humans. The use of IR light may affect the types of image sensors 103 used in a ToF system 100. For example, the photodetectors of the image sensor 103 may be made from a semiconductor material having a relatively high quantum efficiency for IR radiation. Germanium-based photodetectors have been used for IR radiation detection due to their high-quantum efficiency in the IR spectra compared to other candidate materials, such as silicon. FIG. 1B is a plot that shows the absorption coefficients for germanium and silicon over the visible and near infrared wavelength range. As seen in FIG. 1B, the absorption coefficients for germanium and silicon both decrease as the wavelength moves from the visible spectrum to the near infrared range. However, in the wavelength range from about 700 nm to 940 nm the absorption coefficient of silicon is lower than germanium by at least an order of magnitude. Beginning at a wavelength of around 940 nm the absorption coefficient for silicon drops rapidly from ~100 cm$^{-1}$ to <10 cm$^{-1}$. In contrast, germanium maintains a relatively high absorption coefficient (i.e., >1000 cm$^{-1}$) over the wavelength range between 940 nm to about 1550 nm, beyond which the absorption coefficient for germanium rapidly decreases.

One issue with existing ToF systems is that certain types of background light, such as bright sunlight, may produce high background noise and decrease signal-to-background noise ratio (SBR) in the image sensor 103, which can negatively affect system performance. Referring again to the plot of FIG. 1B, the spectral composition of solar radiation on earth is also shown over the visible and infrared wavelength range. As shown in FIG. 1B, solar radiation has a generally stronger intensity in the visible range than in the infrared range. However, solar radiation does maintain some intensity over much of the near infrared range. This means that in bright sunlight environments, solar radiation may have a sufficiently strong component of intensity in the near infrared spectrum. Thus, sunlight can be a substantial source of interference for ToF systems. This may be particularly true for ToF systems having germanium-based photodetectors due to the high absorption coefficient of germanium at near IR wavelengths. Further, because the interfering solar radiation may have the same wavelengths as the light signals from the ToF system, this problem cannot be fully eliminated using optical bandpass filtering. For these reasons, ToF systems utilizing germanium-based photodetectors may have limited effectiveness when used in the presence of sunlight.

In order to address the issue of background light interference and improve performance of a Time-of-Flight system, the various embodiments disclosed herein include an image sensor for a Time-of-Flight system that includes at least one primary sensor and at least one secondary sensor. Each primary sensor may include a photodetector having a first material that has a high absorption coefficient for light in the operating wavelength range of the Time-of-Flight system. In one embodiment, the first material may be a germanium-based material. The primary sensor(s) may detect Time-of-Flight measurement light signals that are received at the image sensor 103. Each secondary sensor may include a photodetector having a second material that has a relatively lower absorption coefficient for light in the operating wavelength range of the Time-of-Flight system. In one embodiment, the second material may be a silicon-based material. However, the secondary sensor(s) may detect background light, such as background solar radiation, that is received at the image sensor 103. The amount of background light detected by the at least one secondary sensor may be used to correct for noise due to the background light in the Time-of-Flight measurement, and thereby improve the accuracy of the Time-of-Flight system. In various embodiments, the at least one secondary sensor may include a material that includes an absorption spectrum that significantly overlaps with the solar radiation spectrum. The at least one secondary sensor may detect the solar intensity during the Time-of-Flight measurement which may be used to correct the distance measurements obtained using the primary sensor(s).

Figures 2A, 2B:
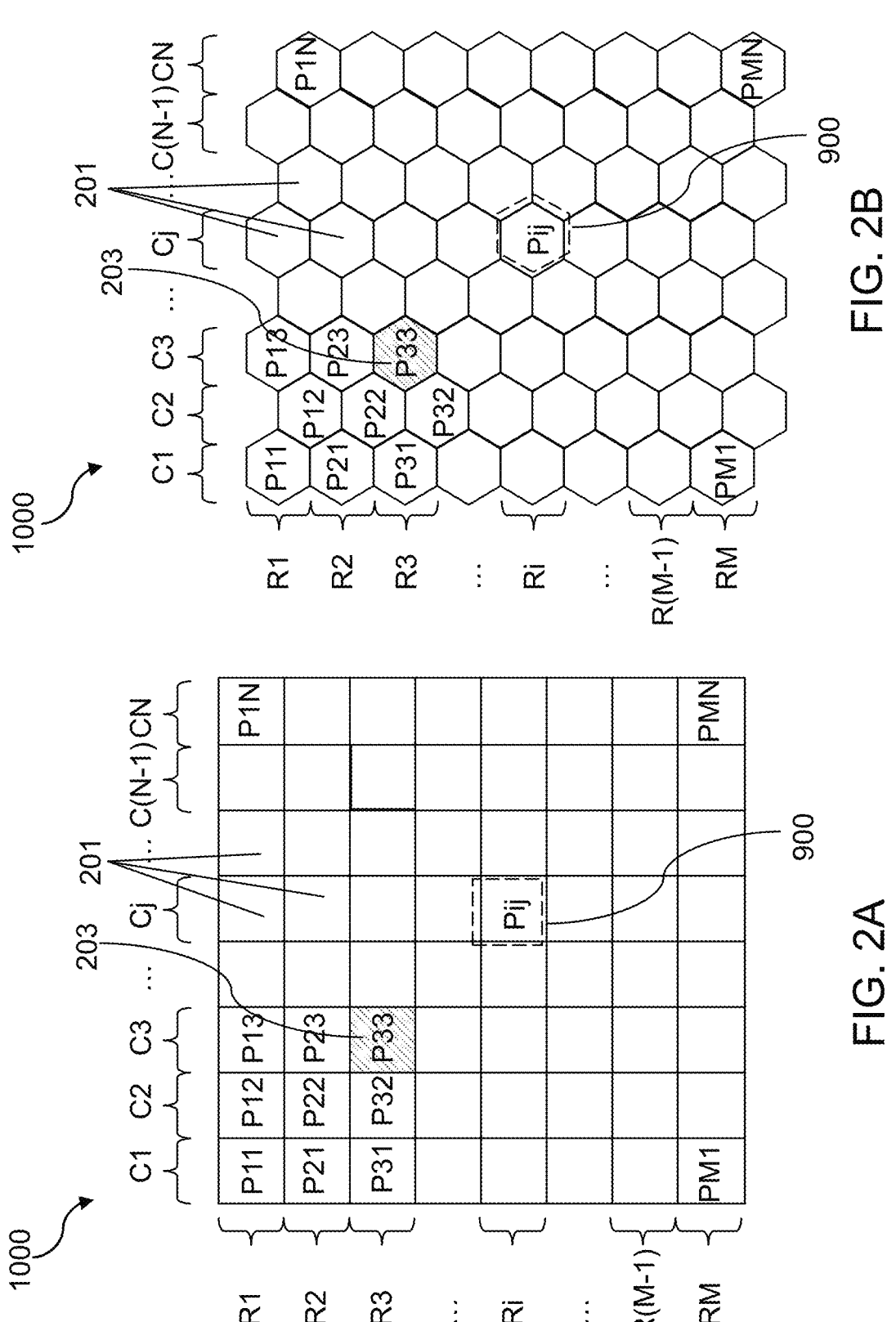
FIG. 2A is a plan view of a first configuration for an array of pixels of an image sensor for a ToF imaging system according to an embodiment of the present disclosure.
FIG. 2B is a plan view of a second configuration for an array of pixels of an image sensor for a ToF imaging system according to another embodiment of the present disclosure.

FIG. 2A is a plan view of a first configuration for an array of pixels of an image sensor 103 for a Time-of-Flight system 100 according to an embodiment of the present disclosure. FIG. 2B is a plan view of a second configuration for an array of pixels of an image sensor 103 for a Time-of-Flight system 100 according to another embodiment of the present disclosure. Referring to FIGS. 2A and 2B, a first configuration for an array 1000 of pixels 900 of an image sensor 103 and a second configuration of an array 1000 of pixels 900 of an image sensor 103 are illustrated in a respective plan view. The image sensor may be a backside illuminated (BSI)

image sensor device. However, for simplicity, embodiments of the disclosure are discussed as used in a front-side illuminated (FSI) image sensor.

Each pixel 900 represents a smallest unit area for the purpose of generating an image from the image sensor 103. The region including the array 1000 of pixels 900 is herein referred to as a pixel array region. The pixels 900 in the pixel array region may be arranged in rows and columns. For example, the pixel array region may include M rows and N columns, in which M and N are integers in a range from 1 to $2^{16}$, such as from $2^8$ to $2^{14}$. The rows of pixels 900 may be consecutively numbered with integers that range from 1 to M, and the columns of pixels 900 may be consecutively numbered with integers that range from 1 to N. A pixel $P_{ij}$ refers to a pixel 900 in the i-th row and in the j-th column.

Each pixel 900 includes at least one photodetector and at least one electronic circuit (i.e., a sensing circuit) that are configured to detect radiation of a particular wavelength range that impinges on the photodetector. Generally, a pixel 900 generates information regarding the impinging radiation for a unit detection area. In some embodiments, a pixel 900 may include a plurality of photodetectors. In one embodiment, each pixel 900 may include a plurality of subpixels, each of which includes a respective combination of a photodetector and an electronic circuit configured to detect radiation that impinged into the photodetector. In some embodiments, each subpixel may be configured to detect radiation in a particular wavelength range, which may be different for each subpixel of the plurality of subpixels. In such embodiments, each subpixel may generate information regarding the intensity of the impinging radiation within a specific wavelength range as detected within a region of the unit detection area. Alternately or in addition, one or more subpixels of a pixel 900 may be a secondary sensor 203 that may be used for background light noise correction, as will be described in further detail below.

Photodetectors in a pixel array region may include photodiodes, complimentary metal-oxide-semiconductor (CMOS) image sensors, charged coupling device (CCD) sensors, active sensors, passive sensors, other applicable sensors, or a combination thereof.

In accordance with various embodiments of the present disclosure, a pixel array 1000 for an image sensor 103 of a Time-of-Flight system 100 may include a plurality of primary sensors 201 and at least one secondary sensor 203. The primary sensors 201 and the at least one secondary sensor 203 may each include at least one photodetector and at least one sensing circuit that are configured to detect radiation impinging on the photodetector.

The primary sensors 201 and the at least one secondary sensor 203 may differ in the material(s) used to form the photodetectors. In various embodiments, the primary sensors 201 may include photodetectors having a germanium-based material. In particular, the photodetectors of the primary sensors 201 may include a photovoltaic junction formed at least partially in a germanium-based material. As used herein, a germanium-based material may include a germanium-containing material that includes germanium at an atomic percentage greater than 50%. A germanium-based material may include elemental germanium, or compound or alloy of germanium and one or more other elements, where the germanium-based material includes germanium at an atomic percentage greater than 50%.

The at least one secondary sensor 203 may include at least one photodetector having a second material that is different than the germanium-based material of the photodetectors of the primary sensors 201. In particular, the photodetectors of the secondary sensors 203 may include a photovoltaic junction formed in a second material that is different than the germanium-based material of the photodetectors of the primary sensors 201. The second material may include germanium at an atomic percentage between 0% and 50%. In various embodiments, the second material may be a silicon-based material. As used herein, a silicon-based material may include a silicon-containing material that includes silicon at an atomic percentage greater than 50%. A silicon-based material may include elemental silicon, or a compound or alloy of silicon and one or more other elements, where the silicon-based material includes silicon at an atomic percentage greater than 50%. In various embodiments, the second material may be a silicon-germanium alloy in which the atomic percentage of silicon is greater than 50% and the atomic percentage of germanium is less than 50% (i.e., $Si_xGe_{1-x}$, where $1>x>0.5$).

In further embodiments, the second material of the at least one secondary sensor 203 may include one or more of magnalium spinel carbon bricks, yttrium oxide, and al-oxynitride materials. Other suitable materials are within the contemplated scope of disclosure. In various embodiments, the second material of the at least one secondary sensor 203 may include a material that has an absorption spectrum that significantly overlaps with the solar spectrum.

Referring to FIGS. 2A and 2B, an image sensor 103 according to various embodiments may include an array 1000 of pixels 900, where each pixel 900 of the array 1000 includes either a primary sensor 201 or a secondary sensor 203. As shown in FIGS. 2A and 2B, the shaded pixel, $P_{33}$, includes a secondary sensor 203. The other pixels 900 of the array 1000 may each include a primary sensor 201. Each of the primary sensors 201 may include a photodetector made from a germanium-based material, and the secondary sensor 203 may include a photodetector made from a second material, which may be a silicon-based material, as described above.

Although the exemplary arrays 1000 shown in FIGS. 2A and 2B each have a single pixel 900 that includes a secondary sensor 203, it will be understood that multiple pixels 900 of each array 1000 may include secondary sensors 203. One or more pixels 900 including a secondary sensor 203 may be located at any location in the array 1000, including at or near the center of the array 1000, along or near one or more edges of the array 1000, and/or in other locations in the array 1000. Multiple pixels 900 including secondary sensors 203 may be arranged in a regular pattern in the array 1000, or may be randomly distributed throughout the array 1000. In various embodiments, the number of pixels 900 of the array 1000 that include a primary sensor 201 may be greater than or equal to the number of pixels 900 in the array that include a secondary sensor 203.

Figures 3A, 3B:
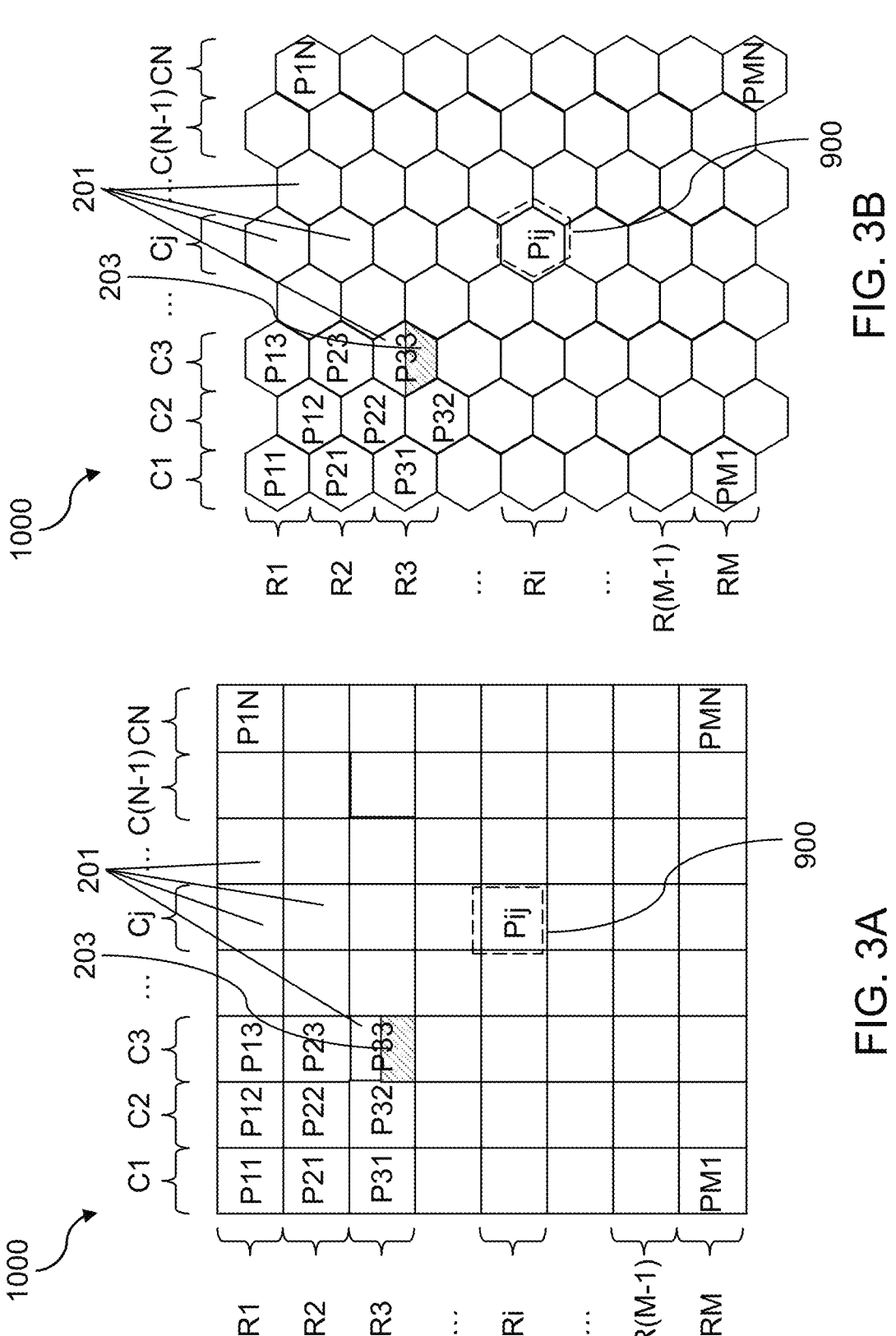
FIG. 3A is a plan view of a third configuration for an array of pixels of an image sensor for a ToF imaging system according to another embodiment of the present disclosure.
FIG. 3B is a plan view of a fourth configuration for an array of pixels of an image sensor for a ToF imaging system according to another embodiment of the present disclosure.

Referring now to FIGS. 3A and 3B, a third configuration for an array 1000 of pixels 900 of an image sensor 103 and a fourth configuration of an array 1000 of pixels 900 of an image sensor 103 are illustrated in a respective plan view. In the third configuration and the fourth configuration, an image sensor 103 includes an array 1000 of pixels 900, where at least one pixel 900 of the array 1000 includes both a primary sensor 201 and a secondary sensor 203. As shown in FIGS. 3A and 3B, the partially shaded pixel, $P_{33}$, includes a both a primary sensor 201 and a secondary sensor 203. The primary sensor 201 may include a photodetector made from a germanium-based material, and the secondary sensor 203 may include a photodetector made from a second material, which may be a silicon-based material, as described above.

One or more of the pixels 900 in the array 1000 shown in FIGS. 3A and 3B may include a plurality of subpixels, where each subpixel may include a photodetector and a sensing circuit. Referring to FIGS. 3A and 3B, the partially shaded pixel, P$_{33}$, may have a first subpixel that includes a primary sensor 201 and a second subpixel that includes a secondary sensor 203. In some embodiments, a pixel 900 may include more than two subpixels. For example, a pixel 900 may have at least two subpixels that include primary sensors 201 and at least one subpixel that includes a secondary sensor 203. Alternately, a pixel 900 may have at least two subpixels that include primary sensors 201 and at least two subpixels that include secondary sensors 203. In various embodiments, the number of subpixels of a given pixel 900 that include primary sensors 201 may be equal to or greater than the number of subpixels of the pixel 900 that include secondary sensors 203.

Although the exemplary arrays 1000 shown in FIGS. 3A and 3B each have a single pixel 900 that includes both a primary sensor 201 and a secondary sensor 203, it will be understood that multiple pixels 900 of each array 1000, may include secondary sensors 203, such as all pixels 900 of the array 1000. In various embodiments, each pixel 900 of an array 1000 may include multiple subpixels, including at least one subpixel containing a primary sensor 201 and at least one subpixel containing a secondary sensor 203. Alternately, only some pixels 900 of an array 1000 may include multiple subpixels, and other pixels 900 of the array 1000 may not include multiple subpixels in some embodiments.

Subpixels including secondary sensors 203 may be arranged in a regular pattern in the array 1000, or may be randomly distributed throughout the array 1000. In general, the total number of primary sensors 201 in an array 1000 may be equal to or greater than the total number of secondary sensors 203 in the array 1000.

Although the first, second, third and fourth configurations for the array 1000 of pixels 900 shown in FIGS. 2A-2B and 3A-3B illustrate secondary sensors 203 having a polygonal shape when seen in plan view, it will be understood that a secondary sensor 203 may have any shape, such as a circular, elliptical, triangular or irregular shape.

Figure 4A:
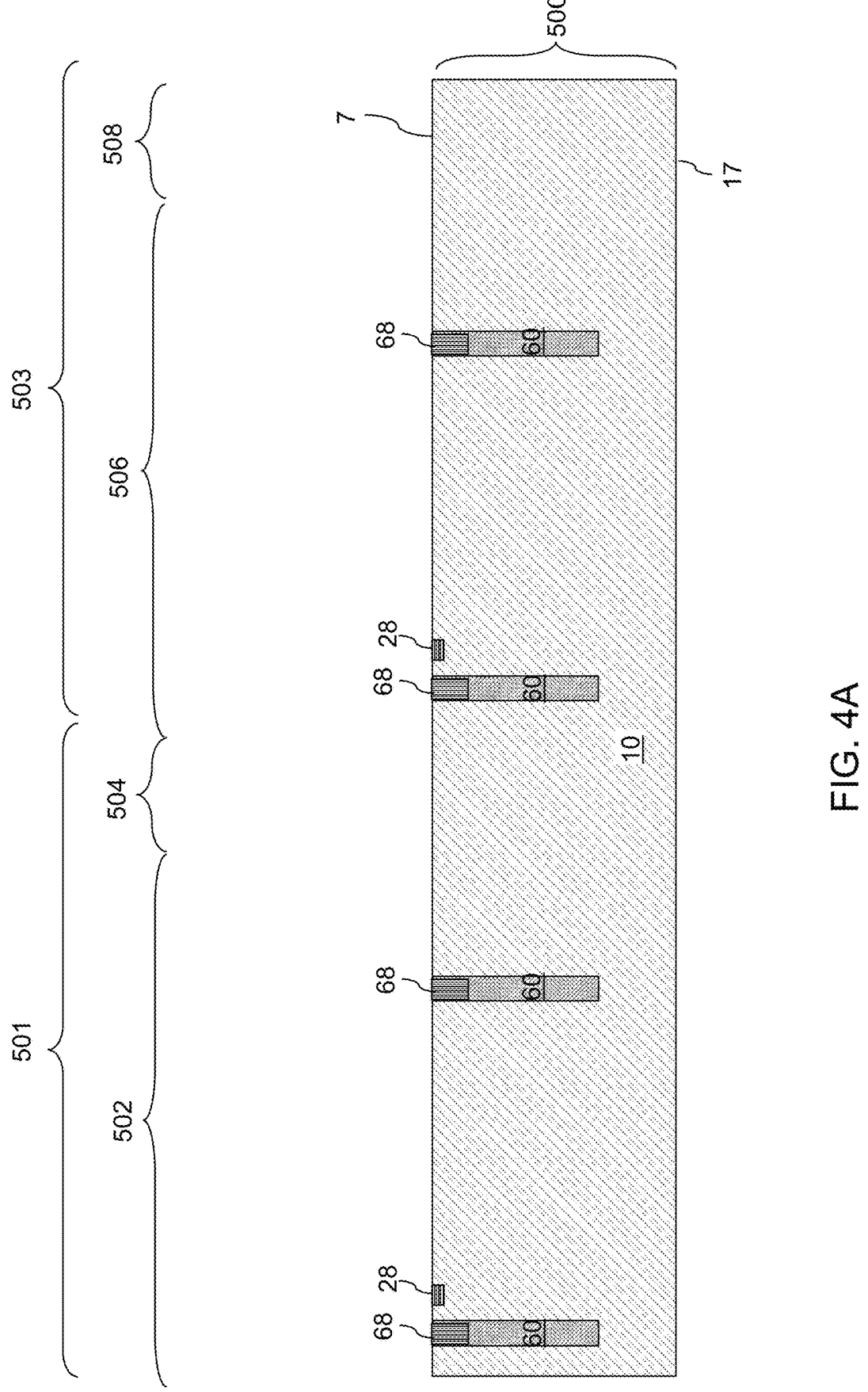
FIGS. 4A-4M are sequential vertical cross-sectional views of a first exemplary structure during formation of an image sensor for a ToF system that includes at least one primary sensor having a photodetector made from a germanium-based material, and at least one secondary sensor having a photodetector made from a second material according to an embodiment of the present disclosure.

FIGS. 4A-4M are sequential vertical cross-sectional views of a first exemplary structure during formation of an image sensor for a Time-of-Flight (TOF) system that includes at least one primary sensor 201 having a photodetector made from a germanium-based material, and at least one secondary sensor 203 having a photodetector made from a second material according to a first embodiment of the present disclosure. FIG. 4A is a vertical cross-sectional view illustrating an intermediate structure for making an image sensor for a ToF system. Referring to FIG. 4A, the first exemplary structure includes a substrate 500 that includes a semiconductor material layer 10. The substrate 500 may include a first major horizontal surface located on a front side 7 of the substrate 500, and a second major surface located on a back side 17 of the substrate 500. The substrate 500 may include a bulk semiconductor substrate, which the semiconductor material layer 10 may continuously extend from the front side 7 to the back side 17 of the substrate 500 as shown in FIG. 4A. In other embodiments, the substrate 500 may have a semiconductor-on-insulator structure in which the semiconductor material layer 10 is located over a buried insulator layer of the substrate 500.

The substrate 500 may include at least one first region 501 in which a primary sensor 201 of an image sensor 103 may be subsequently formed. The substrate 500 may also include at least one second region 503 in which a secondary sensor 203 of the image sensor 103 may be subsequently formed. The first region 501 may include a first photodetector region 502 and a first sensing circuit region 504 in which a photodetector and a sensing circuit, respectively, may be subsequently formed. The second region 503 may similarly include a second photodetector region 506 and a second sensing circuit region 508 in which a photodetector and a sensing circuit, respectively, may be subsequently formed.

Although only a single first region 501 and a single second region 503 are illustrated for clarity, it will be understood that a plurality of first regions 501 and a plurality of second regions 503 may located on the substrate 500 upon which an array of primary sensors 201 and secondary sensors 203 may be subsequently formed. In various embodiments, each of the first region 501 and the second region 503 of the substrate 500 may correspond to an individual pixel 900 of an array 1000, in accordance with the first and second configurations for an array 1000 of pixels 900 described above with reference to FIGS. 2A and 2B. Alternately, each of the first region 501 and the second region 503 of the substrate 500 may correspond to portions of a pixel 900 of an array 1000 (i.e., subpixels), in accordance with the third and fourth configurations for an array 1000 of pixels 900 described above with reference to FIGS. 3A and 3B.

In the embodiment of FIGS. 4A-4M, the semiconductor material layer 10 may include a semiconductor material that includes germanium at an atomic percentage between 0% and 50%. In various embodiments, the semiconductor material layer 10 may be a silicon-based semiconductor material, and may be a single crystalline silicon material. Other suitable silicon-based semiconductor materials are within the contemplated scope of disclosure, such as polycrystalline silicon, amorphous silicon, and/or a compound or alloy of silicon and one or more other elements. In various embodiments, the semiconductor material layer 10 may include a silicon-germanium alloy in which the atomic percentage of silicon is greater than 50% and the atomic percentage of germanium is less than 50%. A photodetector for a secondary sensor 203 may be subsequently formed in the semiconductor material layer 10 in the second photodetector region 506 of the substrate 500, as described in further detail below.

The semiconductor material layer 10 may have a doping of a suitable conductivity type, which may be p-type or n-type. In one embodiment, the semiconductor material layer 10 may have a doping of a first conductivity type, and may include dopants of the first conductivity type at an atomic concentration in a range from $1.0 \times 10^{13}/\text{cm}^3$ to $1.0 \times 10^{17}/\text{cm}^3$, although lesser and greater dopant concentrations may also be used.

In one embodiment, a masked ion implantation processes may be performed to form various doped regions having various depths. For example, a second-conductivity-type doped well 60 having a doping of the second conductivity type may be formed by ion implantation. The second-conductivity-type doped well 60 may be formed to laterally surround an enclosed region of the semiconductor material layer 10. The second conductivity type is the opposite of the first conductivity type. For example, if the first conductivity type is p-type, the second conductivity type is n-type, and vice versa. The depth of the second-conductivity-type doped well 60 may be in a range from 1 micron to 2 microns, although lesser and greater depths may also be used. The second-conductivity-type doped well 60 may include dopants of the second conductivity type at an atomic concentration in a range from $1.0 \times 10^{15}/\text{cm}^3$ to $1.0 \times 10^{18}/\text{cm}^3$, although lesser and greater dopant concentrations may also be used. As shown in FIG. 4A, a second-conductivity-type doped well 60 may laterally surround an enclosed region of the semiconductor material layer 10 in both the first photodetector region 502 and in the second photodetector region 506. The second-conductivity-type doped wells 60 may isolate the respective photodetector regions 502, 506 of the array 1000 in order to avoid cross-talk and mutual interference between the photodetectors that are subsequently formed in each of the photodetector regions 502, 506. Alternately or in addition, shallow trench isolation structures may be formed in the semiconductor material layer 10 to provide isolation between the respective photodetector regions 502, 506.

Doped well contact regions 68 having a doping of the second conductivity type may be formed in an upper portion of the second-conductivity-type doped wells 60 by performing a masked ion implantation process. The doped well contact regions 68 may be heavily doped to reduce contact resistance. The doped well contact regions 68 may include dopants of the second conductivity type at an atomic concentration in a range from $1.0 \times 10^{19}/cm^3$ to $1.0 \times 10^{22}/cm^3$, although lesser and greater dopant concentrations may also be used.

First doped photodetector contact regions 28 having a doping of the first conductivity type may be formed in the semiconductor material layer 10 within the areas enclosed by the second-conductivity-type doped wells 60. The first doped photodetector contact regions 28 may be heavily doped to reduce contact resistance. The first doped photodetector contact regions 28 may include dopants of the first conductivity type at an atomic concentration in a range from $1.0 \times 10^{19}/cm^3$ to $1.0 \times 10^{22}/cm^3$, although lesser and greater dopant concentrations may also be used.

Figure 4B:
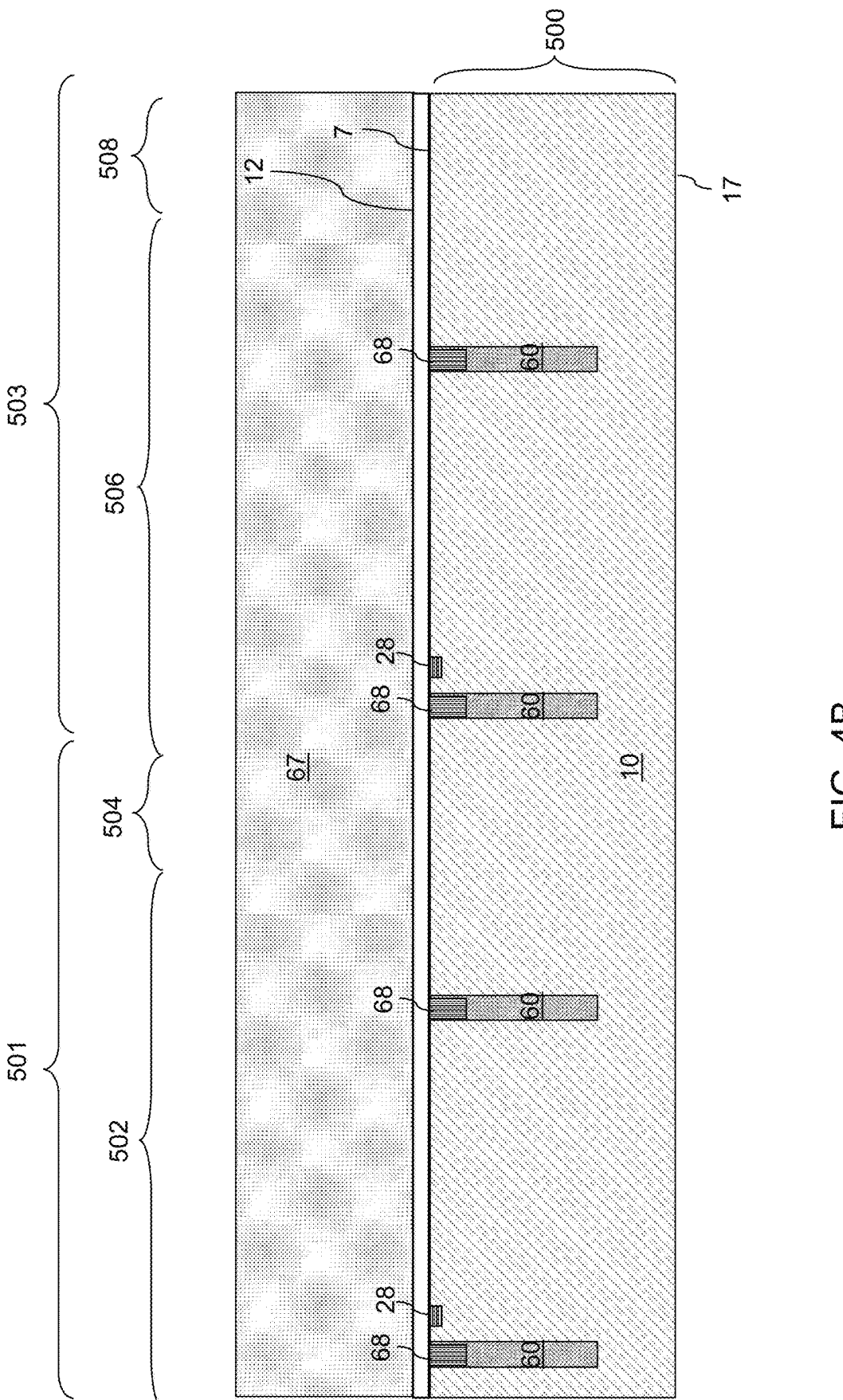

Referring to FIG. 4B, a dielectric mask layer 12 may be formed over the semiconductor material layer 10. The dielectric mask layer 12 includes a dielectric material such as silicon oxide. Other suitable materials are within the contemplated scope of disclosure. The dielectric mask layer 12 may be formed by deposition of a silicon oxide layer or by thermal oxidation of a surface portion of the semiconductor material layer 10. Other suitable deposition methods or techniques are within the contemplated scope of disclosure. The thickness of the dielectric mask layer 12 may be in a range from 50 nm to 300 nm, such as from 80 nm to 150 nm, although lesser and greater thicknesses may also be used.

Figure 4C:
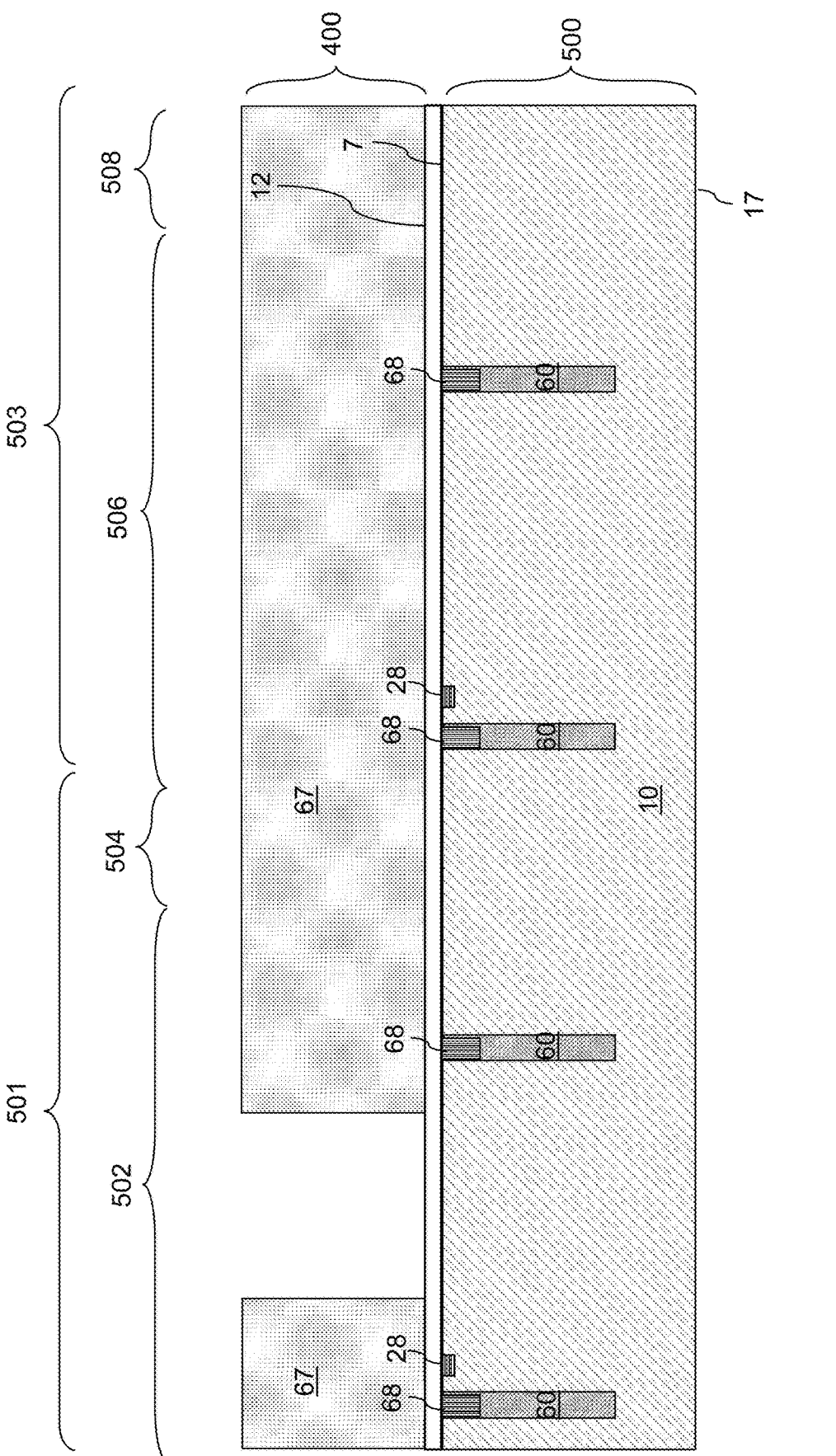

Referring again to FIG. 4B, a photoresist layer 67 may be applied over the dielectric mask layer 12. Referring to FIG. 4C, the photoresist layer 67 may be lithographically patterned to form an etch mask 400. The photoresist layer 67 may include photosensitive material that may be altered when exposed to certain types of radiation. For example, the photoresist material may be positive photoresist material, in which exposure to ultraviolet (UV) radiation makes polymers contained in the photoresist material more soluble and easier to remove, or negative photoresist material, in which exposure to UV radiation makes the polymers crosslink and harder to remove. The photoresist layer 67 may be exposed to radiation (e.g., ultraviolet (UV) light) through a photolithography mask to transfer the mask pattern to the photoresist layer. The undesired photoresist material may then be removed to form the etch mask 400.

Referring to FIG. 4C, the etch mask 400 may extend over the second photodetector region 506, the second sensing circuit region 508 and the first sensing circuit region 504. However, the etch mask 400 may expose at least a portion of the first photodetector region 502. As shown in FIG. 4C, the etch mask 400 may include an opening within the area laterally enclosed by the second-conductivity-type doped well 60 in the first photodetector region 502.

Figure 4D:
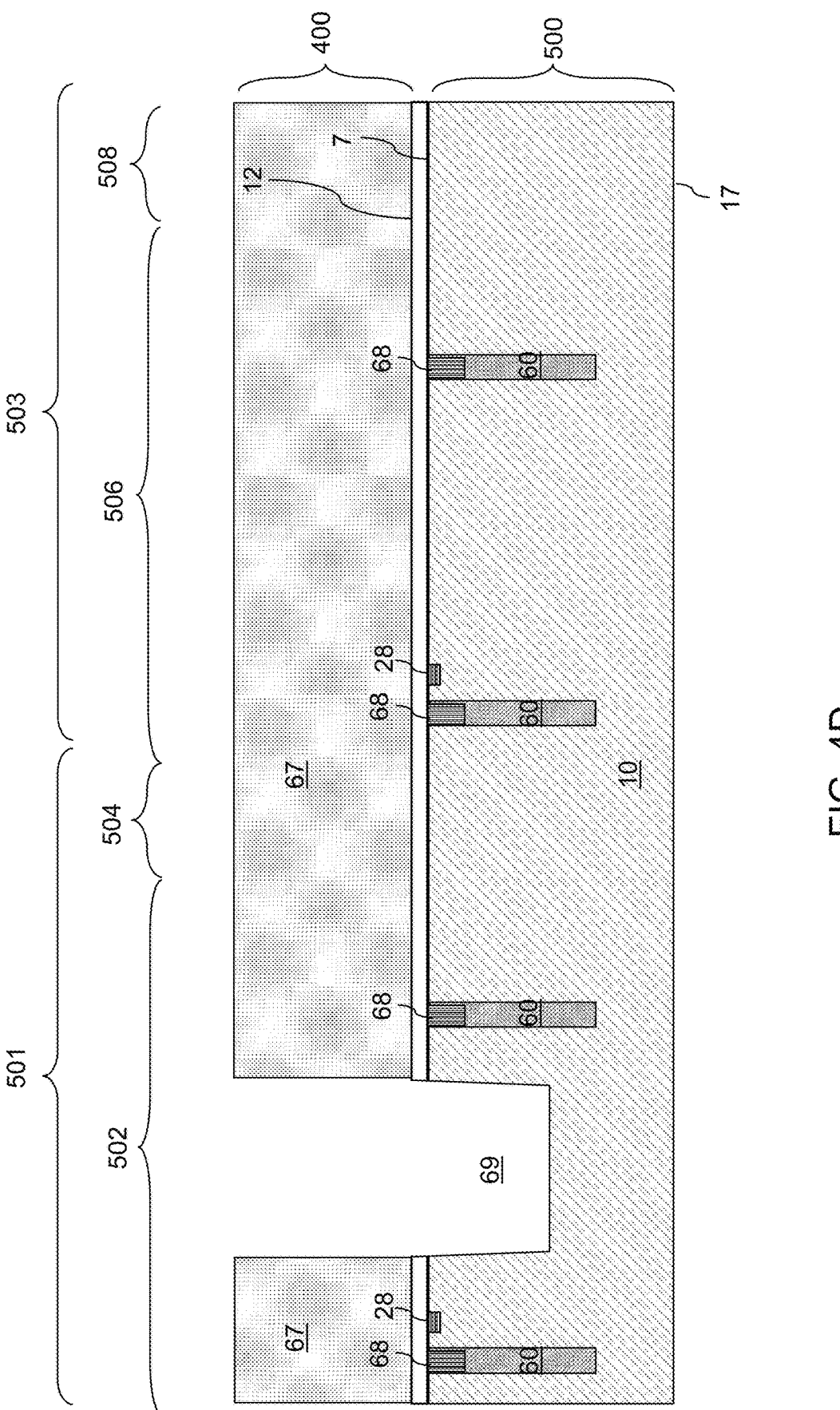

Referring to FIG. 4D, an anisotropic etch process may be performed to remove portions of the dielectric mask layer 12 and the underlying semiconductor material layer 10 to form a trench 69 in the first photodetector region 502. During the etch process, the etch mask 400 may protect the dielectric mask layer 12 and the semiconductor material layer 10 from being etched in the second photodetector region 506, the second sensing circuit region 508 and the first sensing circuit region 504.

The trench 69 formed in the first photodetector region 502 may be laterally enclosed by, and laterally spaced inward from, the second-conductivity-type doped well 60. The depth of the trench 69 may be greater than, the same as, or less than, the depth of the second-conductivity-type doped well 60. In one embodiment, the depth of the trench 69 may be in a range from 0.5 micron to 10 microns, such as from 1 micron to 6 microns, although lesser and greater depths may also be used. The lateral dimension of the trench 69 may be in a range from 0.5 micron to 30 microns, such as from 1 micron to 15 microns, although lesser and greater lateral dimensions may also be used. The lateral dimension of the trench 69 may be the diameter or the major axis of the horizontal cross-sectional shape of the trench 69 in embodiments in which the trench 69 has a circular or an elliptical horizontal cross-sectional shape, or may be the length of a side of a rectangular shape in embodiments in which the horizontal cross-sectional shape of the trench 69 is the rectangular shape. The etch mask 400 may be subsequently removed, for example, by ashing.

Figure 4E:
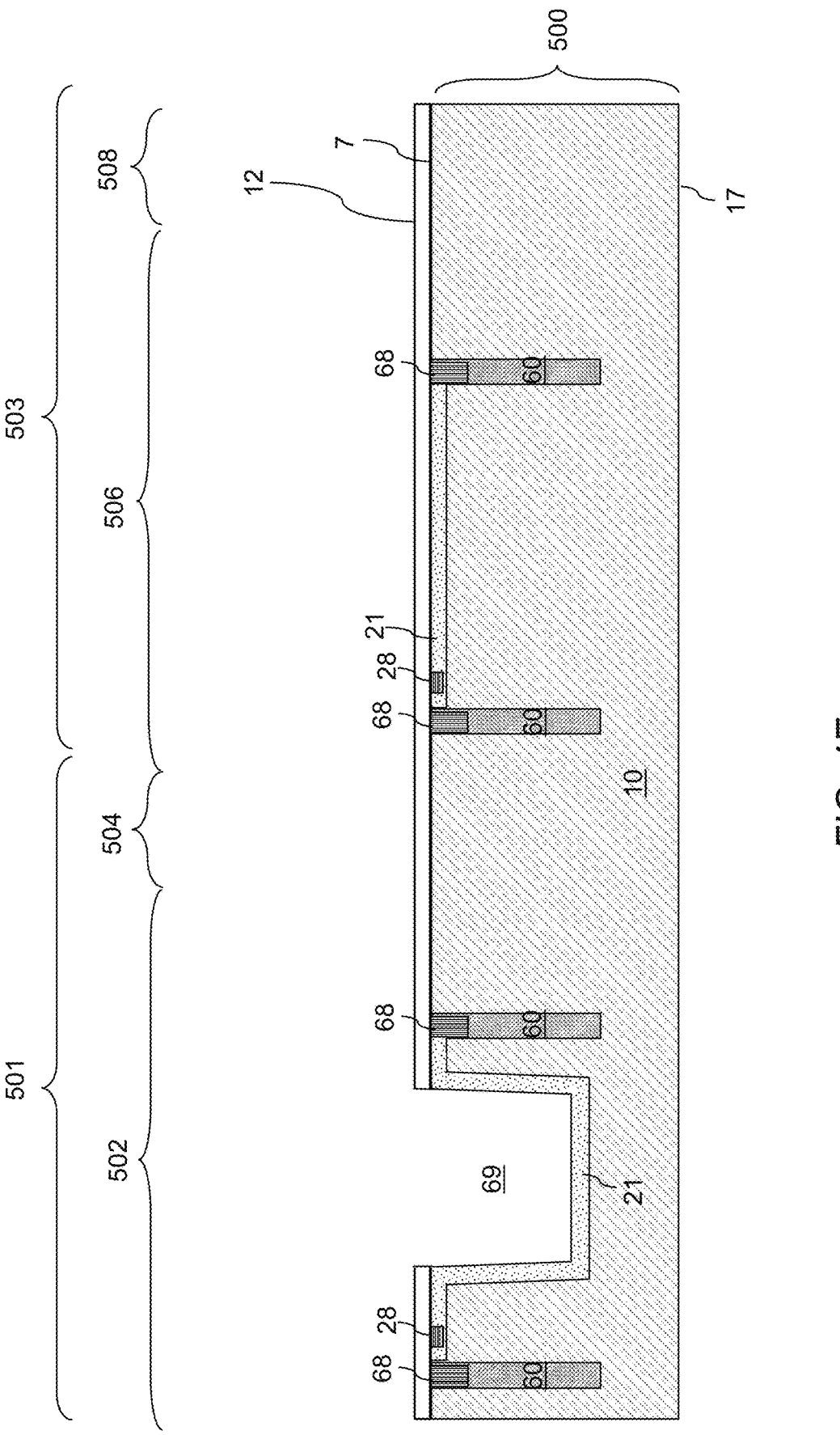

Referring to FIG. 4E, dopants of the first conductivity type may be implanted around the region of the trench 69 in the first photodetector region 502. The dopants of the first conductivity type may be implanted at least within the area laterally enclosed by the second-conductivity-type doped well 60. A multiple angled ion implantation processes may be performed to implant the dopants of the first conductivity type through sidewalls of the trench 69. Further, the dopants of the first conductivity type may be implanted into surface portions of the semiconductor material layer 10 in the first photodetector region 502. In addition, the dopants of the first conductivity type may be implanted into a horizontal portion of the semiconductor material layer 10 that underlies the bottom surface of the trench 69. A first-conductivity-type semiconductor material region 21 may be formed within the semiconductor material layer 10 in the first photodetector region 502. The first-conductivity-type semiconductor material region 21 may be connected to the first doped photodetector contact region 28, which is the contact region for the first-conductivity-type semiconductor material region 21. The lateral width of the first-conductivity-type semiconductor material region 21 around each sidewall of the trench 69 may be in a range from 100 nm to 1,000 nm, although lesser and greater lateral dimensions may also be used. The thickness of the horizontal portion of the first-conductivity-type semiconductor material region 21 underneath the bottom surface of the trench 69 may be in a range from 100 nm to 1,000 nm, although lesser and greater thicknesses may also be used.

Referring again to FIG. 4E, dopants of the first conductivity type may also be implanted in the semiconductor material layer 10 in the second photodetector region 506 to form a first-conductivity-type semiconductor material region 21 in the second photodetector region 502. The dopants of the first conductivity type may be implanted at least within a portion of the area laterally enclosed by the second-conductivity-type doped well 60 in the second photodetector region 502. The first-conductivity-type semiconductor material region 21 may be connected to the first doped photodetector contact region 28 in the second photodetector region 502, which is the contact region for the first-conductivity-type semiconductor material region 21.

Figure 4F:
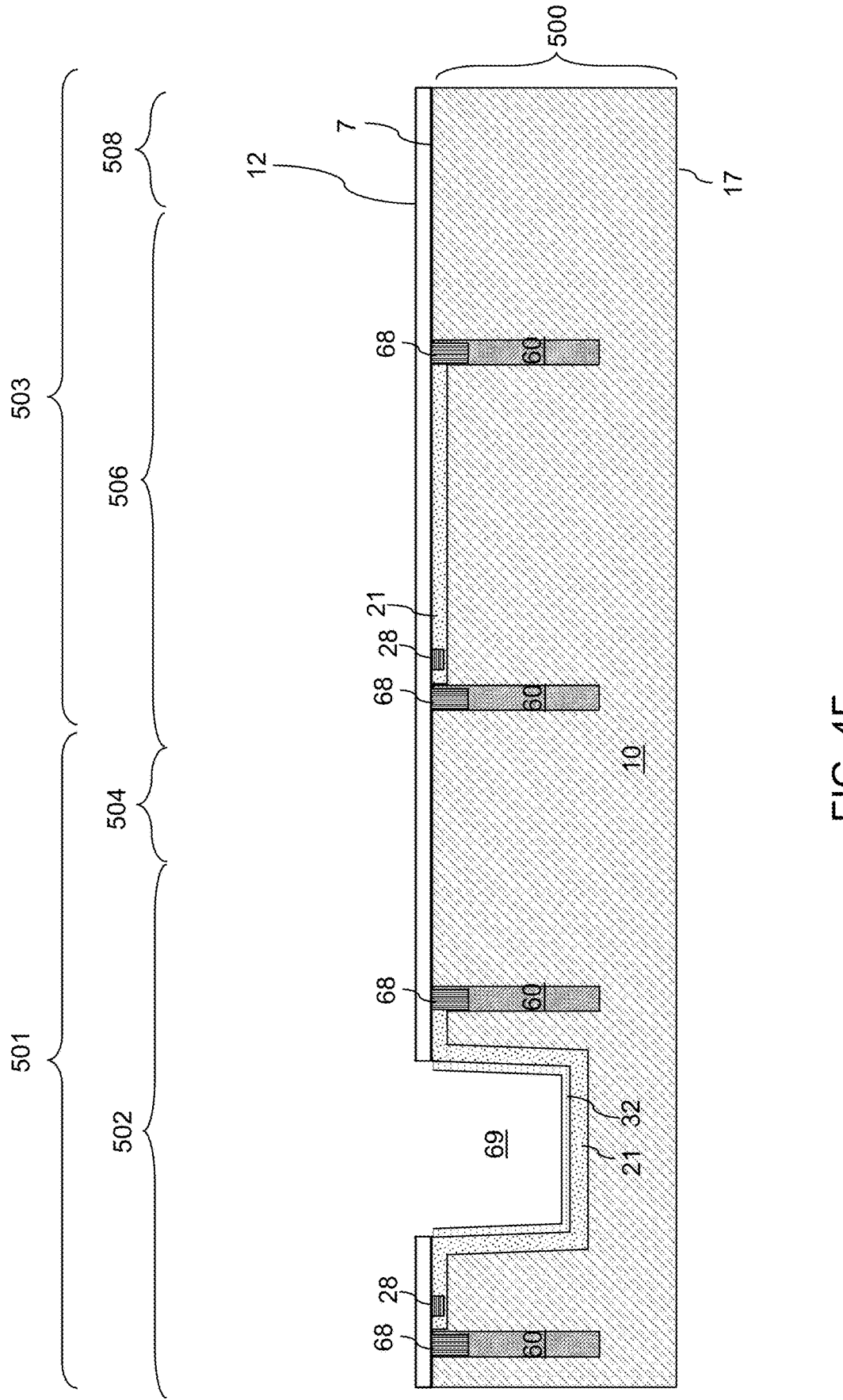

Referring to FIG. 4F, in some embodiments a semiconductor material liner 32 may be optionally grown from physically exposed surfaces of the first-conductivity-type semiconductor material region 21, which are surfaces of the trench 69. The semiconductor material liner 32 may be grown by a selective epitaxy process that grows epitaxial semiconductor material, such as epitaxial silicon, only from physically exposed semiconductor surfaces and does not grow semiconductor material from dielectric surfaces in some embodiments. The semiconductor material liner 32 may include epitaxially grown silicon, i.e., single crystalline silicon in epitaxial alignment with single crystalline silicon material of the semiconductor material layer 10. The semiconductor material liner 32 may be intrinsic, or may have a low level of doping. For example, the atomic concentration of dopants within the semiconductor material liner 32 may be in a range from $1.0 \times 10^{13}/cm^3$ to $1.0 \times 10^{16}/cm^3$, although lesser and greater dopant concentrations may also be used. The conductivity type of the semiconductor material liner 32, in embodiments in which the semiconductor material liner 32 is not intrinsic, may be the first conductivity type or the second conductivity type. The thickness of the semiconductor material liner 32 may be in a range from 5 nm to 200 nm, such as from 10 nm to 100 nm, although lesser and greater thicknesses may also be used. The semiconductor material liner 32, if present, may function as a buffer between a germanium-based material to be subsequently deposited in the trench 69 and the first-conductivity-type semiconductor material region 21.

Figure 4G:
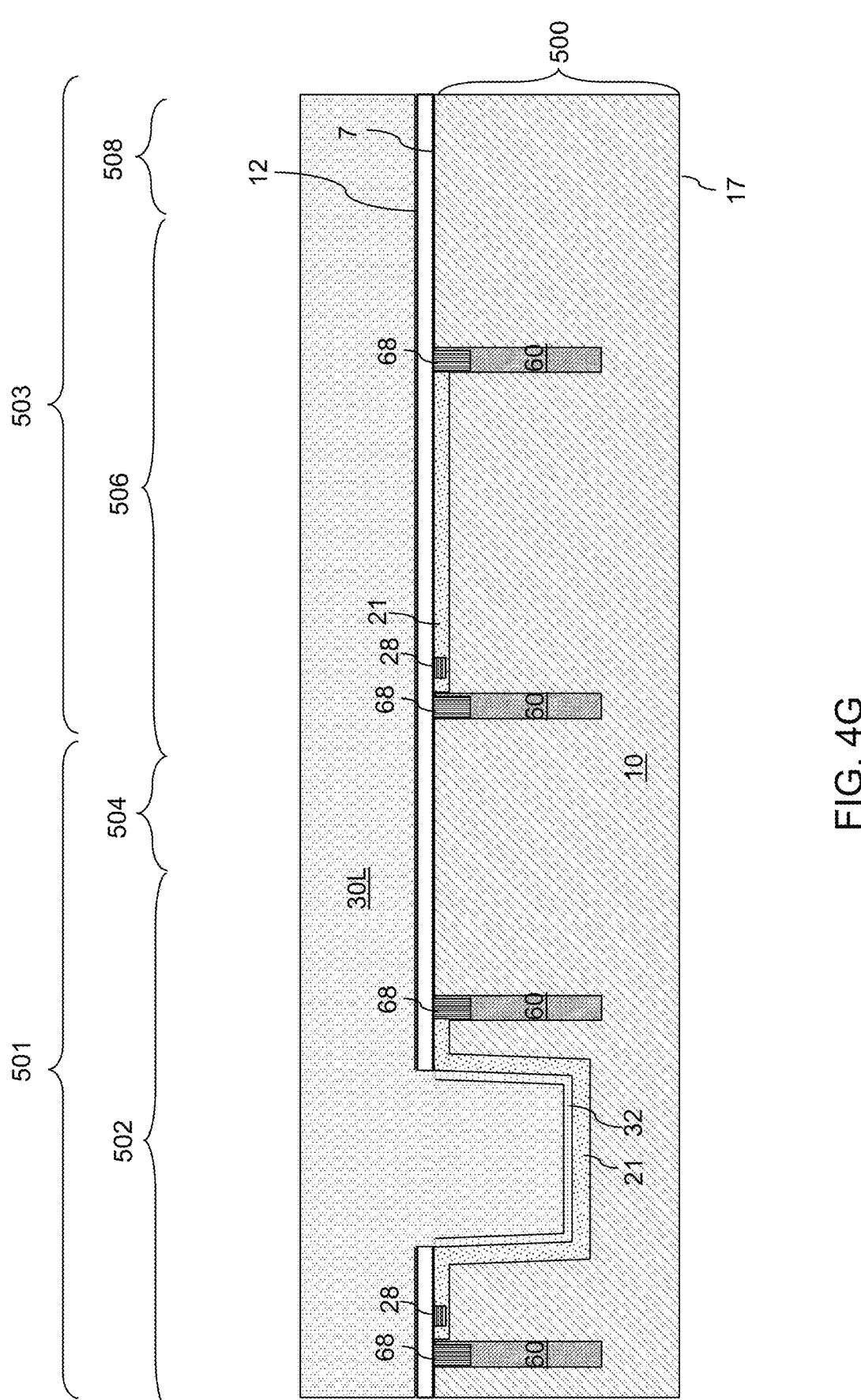

Referring to FIG. 4G, a germanium-based material may be grown from the physically exposed surfaces of the semiconductor material liner 32 in embodiments that include the semiconductor material liner 32 or from the physically exposed surfaces of the first-conductivity-type semiconductor material region 21 in embodiments that do not include the semiconductor material liner 32. The germanium-based material includes germanium at an atomic percentage greater than 50%. In one embodiment, the germanium-containing material may include doped or undoped germanium such that the atomic percentage of germanium is at least 99%, and is basically or essentially free of silicon or other elements. In another embodiment, the germanium-containing material may include a silicon-germanium alloy in which the atomic percentage of germanium is greater than 50%, and the atomic percentage of silicon is less than 50%. A germanium-containing material layer 30L may be formed by the deposited germanium-based material.

The germanium-containing material layer 30L may be formed by a selective deposition process or a non-selective deposition process. A selective deposition process is a process in which the germanium-containing material may be grown from physically exposed semiconductor surfaces such as the physically exposed surfaces of the semiconductor material liner 32 or the physically exposed surfaces of the first-conductivity-type semiconductor material region 21. In this embodiment, a germanium-containing reactant (such as germane or di-germane) may be flowed into a process chamber containing the first exemplary structure concurrently with, or alternately with, flow of an etchant gas such as hydrogen chloride. Generally, a semiconductor material (such as a germanium-containing material) has a higher growth rate on semiconductor surfaces than on dielectric surfaces. The flow rates and the deposition temperature may be controlled such that the net deposition rate (i.e., the deposition rate less the etch rate) is positive on semiconductor surfaces, and is negative on dielectric surfaces during the selective deposition process. In this embodiment, growth of the germanium-containing material mainly occurs on semiconductor surfaces. A non-selective deposition process is a deposition process in which the germanium-containing material indiscriminately grows from physically exposed surfaces, such as all physically exposed surfaces. In this embodiment, the deposition process may use a germanium-containing reactant without use of an etchant gas.

In one embodiment, the selective deposition process or the non-selective deposition process that is used to deposit the germanium-containing material layer 30L may be an epitaxial deposition process, i.e., a deposition process that provides alignment of crystallographic structure of the deposited germanium-containing material to the crystalline structure at the physically exposed surfaces of the underlying material portions. Thus, the portion of the germanium-containing material layer 30L that may be deposited in the trench 69 may be epitaxially aligned to the crystalline structure of the semiconductor material liner 32 (in embodiments in which the semiconductor material liner 32 is included) and/or the crystalline structure of the first-conductivity-type semiconductor material region 21. In embodiments in which a selective epitaxial deposition process is used to deposit the germanium-containing material layer 30L, the material of the germanium-containing material layer 30L grows from the physically exposed surfaces of the semiconductor material liner 32 or the first-conductivity-type semiconductor material region 21. In such embodiments, the entirety of the germanium-containing material layer 30L may be single crystalline and may be in epitaxial alignment with the single crystalline semiconductor material of the single crystalline semiconductor material layer 10. In embodiments in which a non-selective epitaxial deposition process is used to deposit the germanium-containing material layer 30L, the material of the germanium-containing material layer 30L may grow from the physically exposed surfaces of the semiconductor material liner 32 (in embodiments in which the semiconductor material liner 32 is included) or the first-conductivity-type semiconductor material region 21, and from the physically exposed surfaces of the dielectric mask layer 12. In this embodiment, only the portion of the germanium-containing material layer 30L that grows from the physically exposed surfaces of the semiconductor material liner 32 (in embodiments in which the semiconductor material liner 32 is included) or the first-conductivity-type semiconductor material region 21 may be single crystalline, and the portions of the germanium-containing material layer 30L that grows from the physically exposed surfaces of the dielectric mask layer 12 may be polycrystalline.

Generally, an epitaxial deposition process may be performed to grow a single crystalline germanium-containing material inside the trench 69. At least the portion of the germanium-containing material layer 30L that grows within the trench 69 may be single crystalline, and may be formed with epitaxial alignment with the single crystalline material of the single crystalline semiconductor material substrate 10. In this embodiment, the entirety of the portion of the germanium-containing material layer 30L located within the trench 69 may be single crystalline.

The germanium-containing material layer 30L may be intrinsic, or may have a low level of doping. For example, the atomic concentration of dopants within the germanium-containing material layer 30L may be in a range from $1.0 \times 10^{13}/cm^3$ to $1.0 \times 10^{18}/cm^3$, although lesser and greater dopant concentrations may also be used.

Figure 4H:
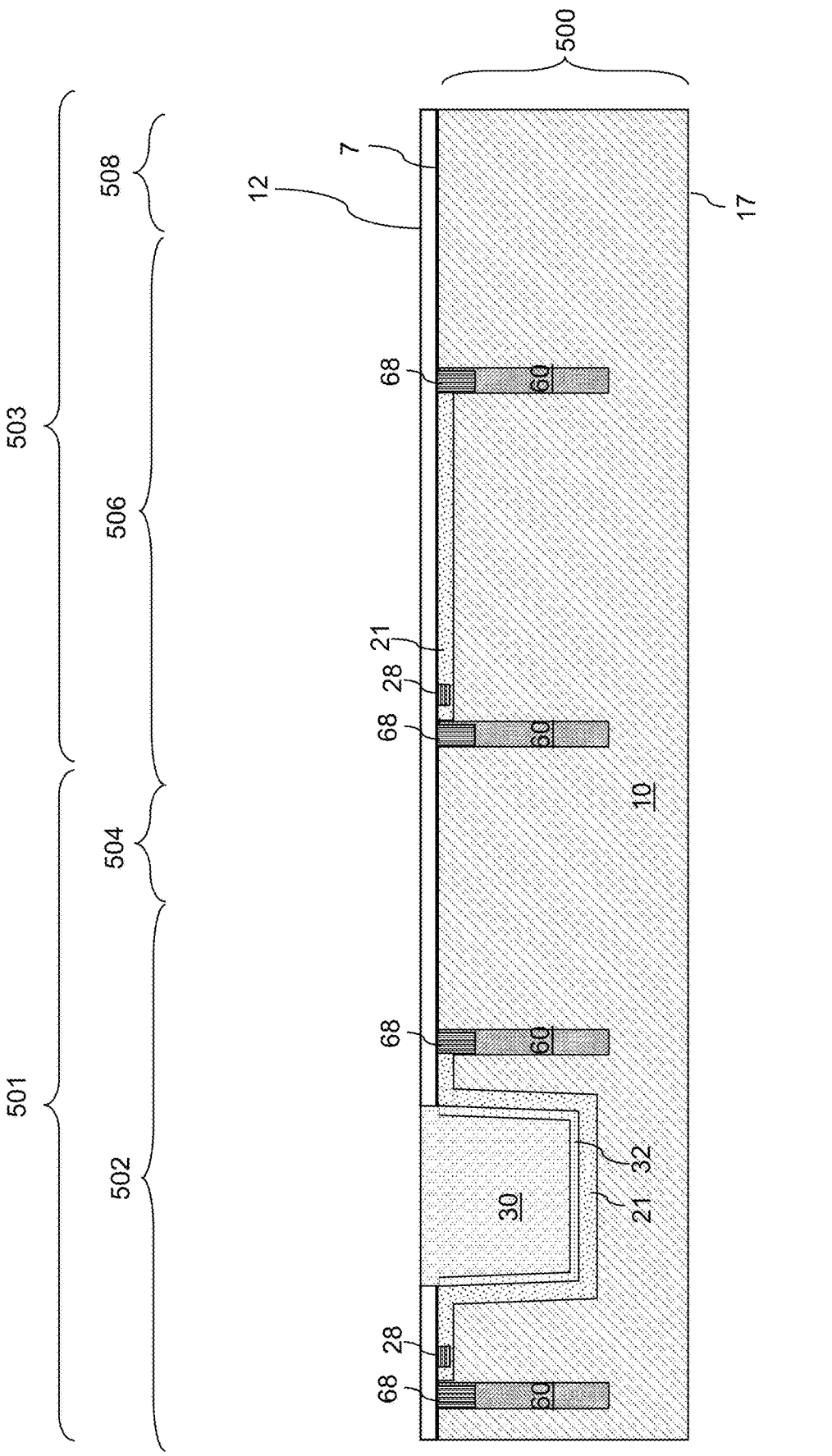

Referring to FIG. 4H, excess portions of the germanium-containing material may be removed from above the horizontal plane including the top surface of the dielectric mask layer 12. In one embodiment, a chemical mechanical planarization (CMP) process may be performed to remove portions of the germanium-containing material layer 30L located above the horizontal plane including the top surface of the dielectric mask layer 12. A remaining portion of the germanium-containing material layer 30L located within the trench 69 comprises a germanium-containing material portion, which is herein referred to as a germanium-based well 30. The germanium-based well 30 may have a top surface within the same horizontal plane as the top surface of the dielectric mask layer 12 (i.e., co-planar).

While the present disclosure is described using an embodiment in which the germanium-based well 30 is formed as a single crystalline germanium-containing material portion, the germanium-based well 30 may be formed as a polycrystalline material portion or as an amorphous material portion albeit at a reduced efficiency. Such variations are expressly contemplated herein.

Figure 4I:
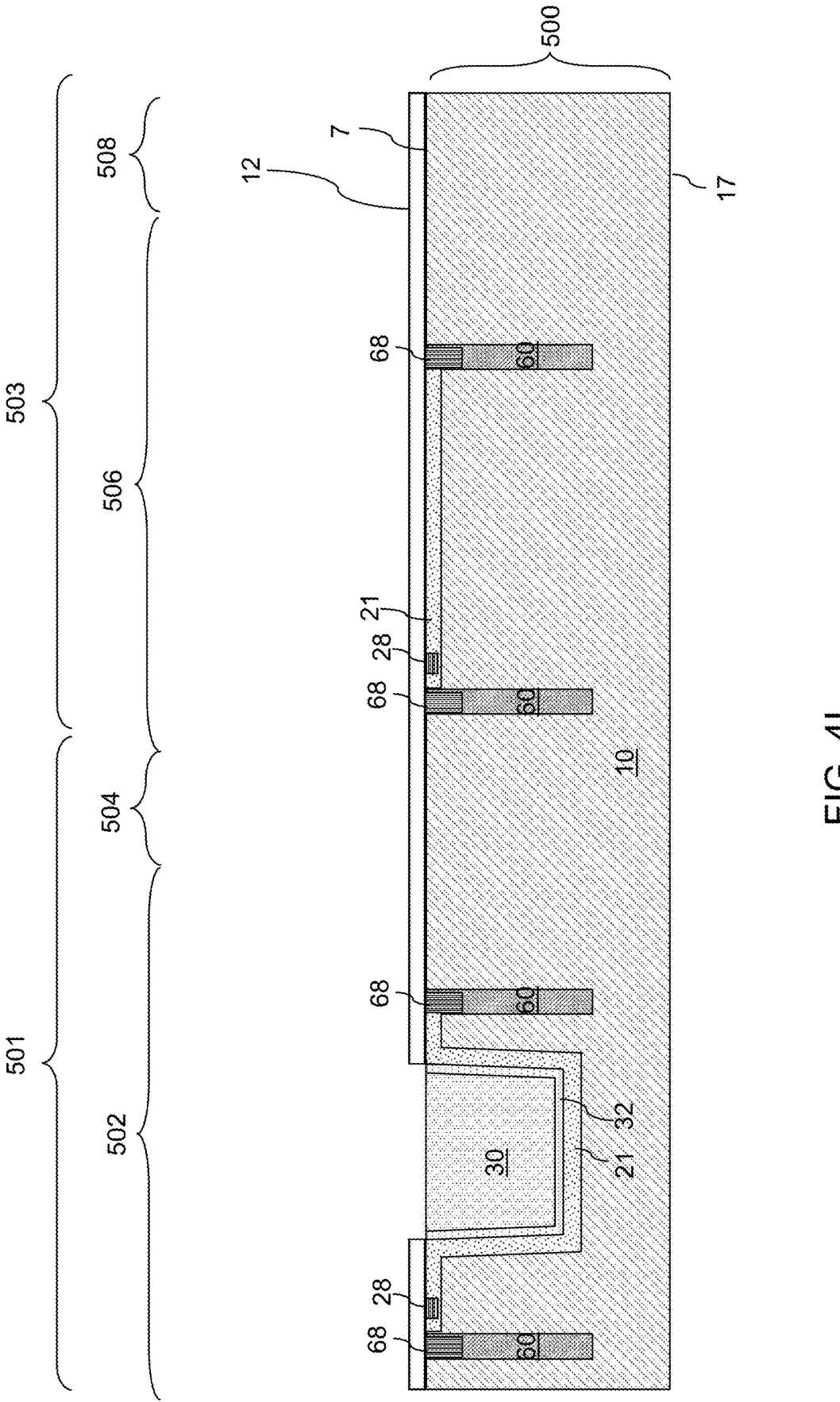

Referring to FIG. 4I, a remaining portion of the germanium-containing material may be vertically recessed within an opening in the dielectric mask layer 12. Specifically, the germanium-based well 30 and optionally an upper portion of the optional semiconductor material liner 32 may be vertically recessed, for example, by performing a recess etch process. In such embodiments, the vertical recess distance may be greater than, the same as, or less than, the thickness of the dielectric mask layer 12. Regardless of the vertical recess distance, the germanium-based well 30 does not contact the dielectric mask layer 12, and the material of the germanium-based well 30 does not contact any oxygen-containing material (such as silicon oxide) of the dielectric mask layer 12. In embodiments in which a semiconductor material liner 32 is not used, the vertical recess distance may be greater than the thickness of the dielectric mask layer 12 to prevent direct contact between the germanium-based well 30 and the dielectric mask layer 12.

Figure 4J:
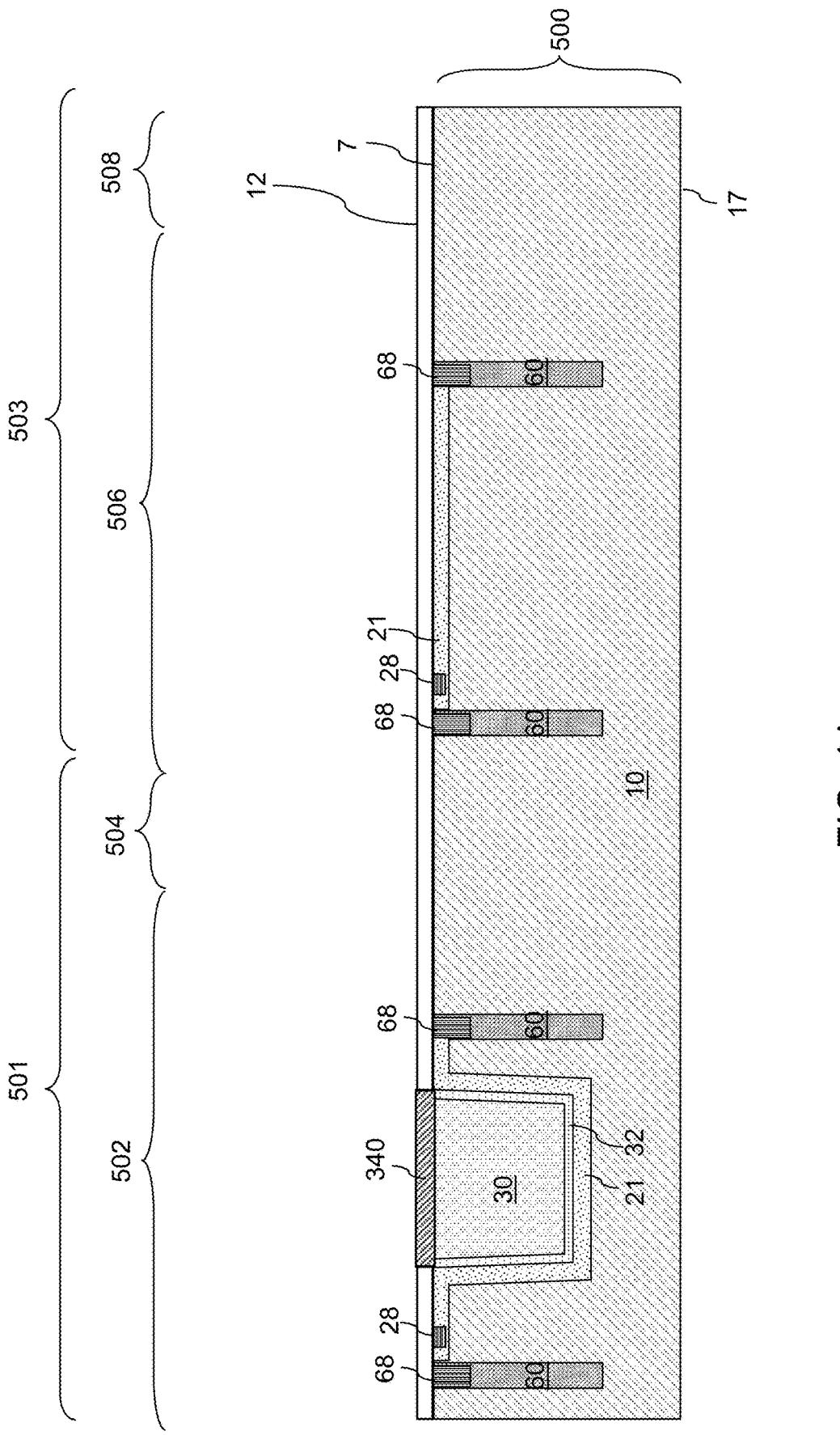

Referring to FIG. 4J, a silicon-containing capping material may be deposited on the physically exposed top surface of the germanium-based well 30. In embodiments in which a semiconductor material liner 32 is present, the silicon-containing capping material may be deposited on the top surface of the semiconductor material liner 32. The silicon-containing capping material may include, or may consist essentially of, a silicon-containing material that may prevent diffusion of oxygen. For example, the silicon-containing capping material may include, or may consist essentially of, silicon or silicon nitride.

In one embodiment, a selective epitaxy process may be performed to grow silicon from the top surface of the germanium-based well 30. In this embodiment, a passivation silicon region 340 including single crystalline silicon may be formed over the germanium-based well 30. Alternatively, a selective or non-selective silicon deposition process may be performed under conditions that forms polycrystalline silicon. In this embodiment, the passivation silicon region 340 may include, or may consist essentially of, polysilicon.

If a selective silicon deposition process (which may, or may not, be an epitaxial deposition process) is used, the passivation silicon region 340 may be formed only inside the opening in the dielectric mask layer 12. In this embodiment, a planarization process is not necessary, and the top surface of the passivation silicon region 340 may be located at, below, or above, the horizontal plane including the top surface of the dielectric mask layer 12. If a non-selective silicon deposition process is used, a planarization process such as a chemical mechanical planarization process may be performed to remove portions of the deposited silicon material from above the horizontal plane including the top surface of the dielectric mask layer 12. In this embodiment, the top surface of the passivation silicon region 340 may be located within the same horizontal plane as the top surface of the dielectric mask layer 12.

In one embodiment, the passivation silicon region 340 as formed may include intrinsic silicon or lightly doped silicon, i.e., silicon including electrical dopants at an atomic concentration in a range from $1.0 \times 10^{13}/cm^3$ to $1.0 \times 10^{17}/cm^3$. The conductivity type of doping in the passivation silicon region 340 may be the first conductivity type or the second conductivity type. Generally, the passivation silicon region 340 may be formed as a single crystalline silicon portion, a polysilicon portion, a microcrystalline silicon portion, or an amorphous silicon portion depending on the deposition conditions.

Figure 4K:
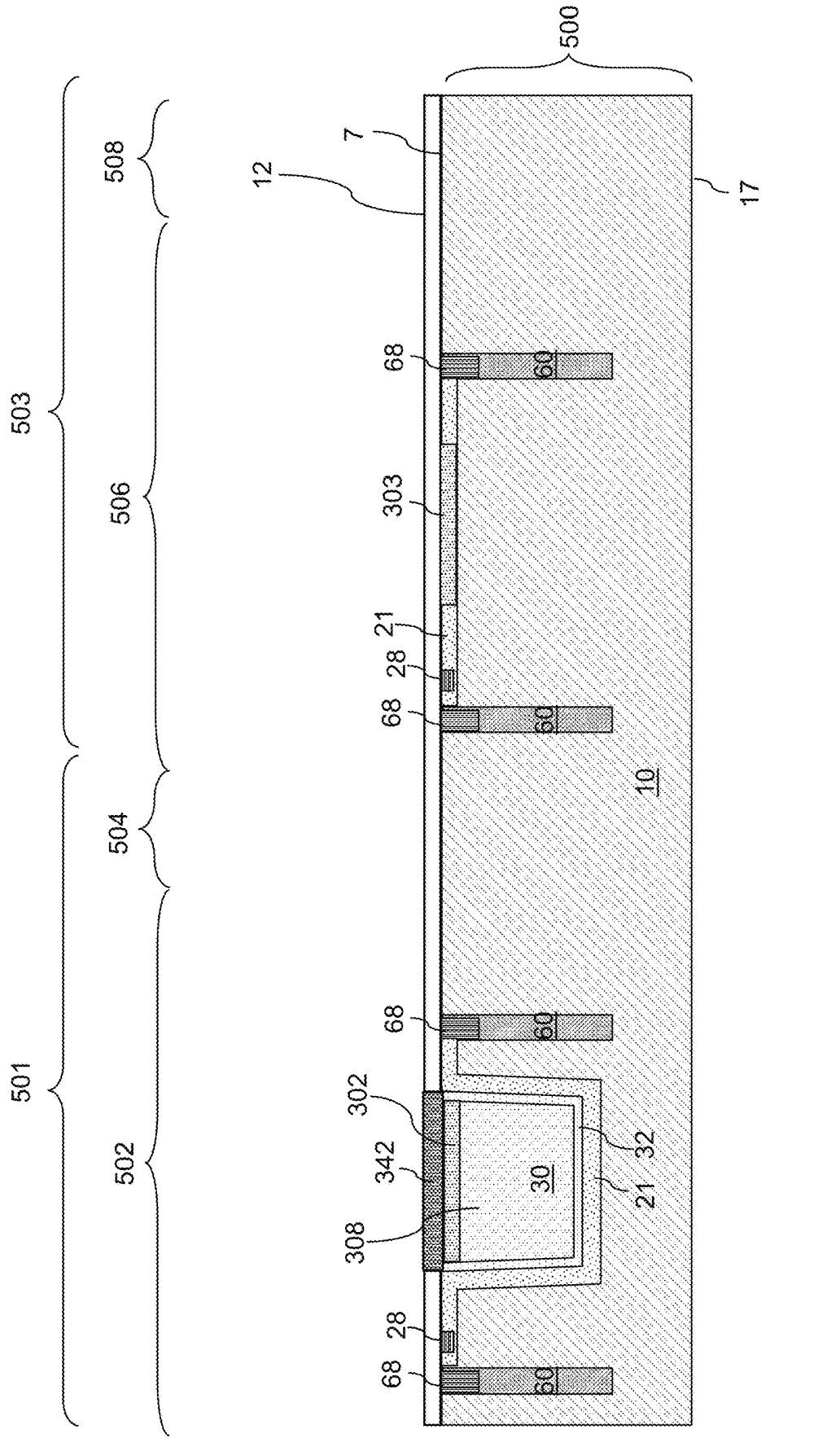

Referring to FIG. 4K, dopants of the second conductivity type may be implanted into the passivation silicon region 340 and an upper portion of the germanium-based well 30 in the first photodetector region 502. The implanted portion of the germanium-based well 30 may be converted into a second-conductivity-type germanium-containing region 302, and the passivation silicon region 340 may be converted into a second-conductivity-type silicon region 342. The atomic concentration of electrical dopants of the second conductivity type in the second-conductivity-type germanium-containing region 302 and the second-conductivity-type silicon region 342 may be in a range from $1.0 \times 10^{18}/cm^3$ to $1.0 \times 10^{21}/cm^3$, although lesser and greater atomic concentrations may also be used. The thickness of the second-conductivity-type germanium-containing region 302 may be in a range from 50 nm to 500 nm, although lesser and greater thicknesses may also be used. The thickness of the second-conductivity-type germanium-containing region 302 may be in a range from 50 nm to 300 nm, although lesser and greater thicknesses may also be used. Although a single second-conductivity-type silicon region 342 and a single second-conductivity-type germanium-containing region 302 are shown in FIG. 4K, in various embodiments multiple discrete second-conductivity-type silicon regions 342 and second-conductivity-type germanium-containing regions 302 may be formed in the first photodetector region 502, such as via a masked ion implantation process.

The un-implanted portion of the germanium-based well 30 is herein referred to as an intermediate germanium-containing region 308. The intermediate germanium-containing region 308 may be intrinsic or may have a doping with an atomic concentration of dopants in a range from $1.0 \times 10^{13}/cm^3$ to $1.0 \times 10^{18}/cm^3$. The intermediate germanium-containing region 308 contacts the second-conductivity-type germanium-containing region 302, and is laterally surrounded by the first-conductivity-type semiconductor material region 21. The combination of the second-conductivity-type germanium-containing region 302 and the intermediate germanium-containing region 308 constitutes a germanium-based well 30.

The first-conductivity-type silicon region 21, the intermediate germanium-containing region 308, and the secondconductivity-type germanium-containing region 302 collectively form a p-i-n type photovoltaic junction, i.e., a photovoltaic junction including a p-doped region, an n-doped region, and an intermediate semiconductor region located between the p-doped region and the n-doped region and including an intrinsic semiconductor material or a lightly-doped semiconductor material. In one embodiment, the first conductivity type may be p-type and the second conductivity type may be n-type. In another embodiment, the first conductivity type may be n-type and the second conductivity type may be p-type. The photovoltaic junction may be formed across the trench 69, i.e., may spatially extend across the boundary of the trench 69 due to the presence of the first-conductivity-type semiconductor material region 21 outside the trench 69. The intermediate germanium-containing region 308 is located within the trench 69, and functions as the intermediate semiconductor region including an intrinsic semiconductor material or a lightly-doped semiconductor material.

In an alternative embodiment, the intermediate germanium-containing region 308 may have a doping of the second conductivity type, and the photovoltaic junction may include a p-n junction formed between the intermediate germanium-containing region 308 and the first-conductivity-type semiconductor material region 21. In this embodiment, the intermediate germanium-containing region 308 may include dopants of the second conductivity type at an atomic concentration in a range from $1.0 \times 10^7/cm^3$ to $1.0 \times 10^{20}/cm^3$, although lesser and greater atomic concentrations may also be used. In embodiments in which the semiconductor material liner 32 is not included, the p-n junction may be formed at the sidewall and the bottom surface of the trench 69. In embodiments in which the silicon liner 32 is included, the silicon liner 32 may be intrinsic, may be p-doped, or may be n-doped. Generally, the photovoltaic junction may comprise a p-i-n junction or a p-n junction formed across the germanium-containing well 30 and the semiconductor material layer 10 that contains the first-conductivity-type silicon region 21.

Referring again to FIG. 4K, dopants of the second conductivity type may also be implanted into the semiconductor material layer 10 in the second photodetector region 506. The implanted portion of the semiconductor material layer 10 may be converted into a second-conductivity-type semiconductor material region 303. The atomic concentration of electrical dopants of the second conductivity type in the second-conductivity-type semiconductor material region 303 may be in a range from $1.0 \times 10^{18}/cm^3$ to $1.0 \times 10^{21}/cm^3$, although lesser and greater atomic concentrations may also be used. The thickness of the second-conductivity-type semiconductor material region 303 may be in a range from 50 nm to 500 nm, although lesser and greater thicknesses may also be used. The thickness of the second-conductivity-type semiconductor region 303 may be in a range from 50 nm to 300 nm, although lesser and greater thicknesses may also be used. Although a single second-conductivity-type semiconductor material region 303 is shown in FIG. 4K, in various embodiments multiple discrete second-conductivity-type semiconductor material regions 303 may be formed in the second photodetector region 506, such as via a masked ion implantation process.

The second-conductivity-type semiconductor material region 303 and the first-conductivity-type semiconductor material region 21 may form a photovoltaic junction in the semiconductor material layer 10 within the second photodetector region 506 of the image sensor. The photovoltaic junction may be a p-n junction or a p-i-n junction.

The implantation of dopants of the second conductivity type in the first photodetector region 502 and in the second photodetector region 506 may occur during the same implantation step, or in separate implantation steps. The implantation of dopants of the second conductivity type in the first photodetector region 502 and the implantation of dopants of the second conductivity type in second photodetector region 506 may use the same or different dopant materials, implantation energies, implantation depths, and/or dopant concentrations.

Figure 4L:
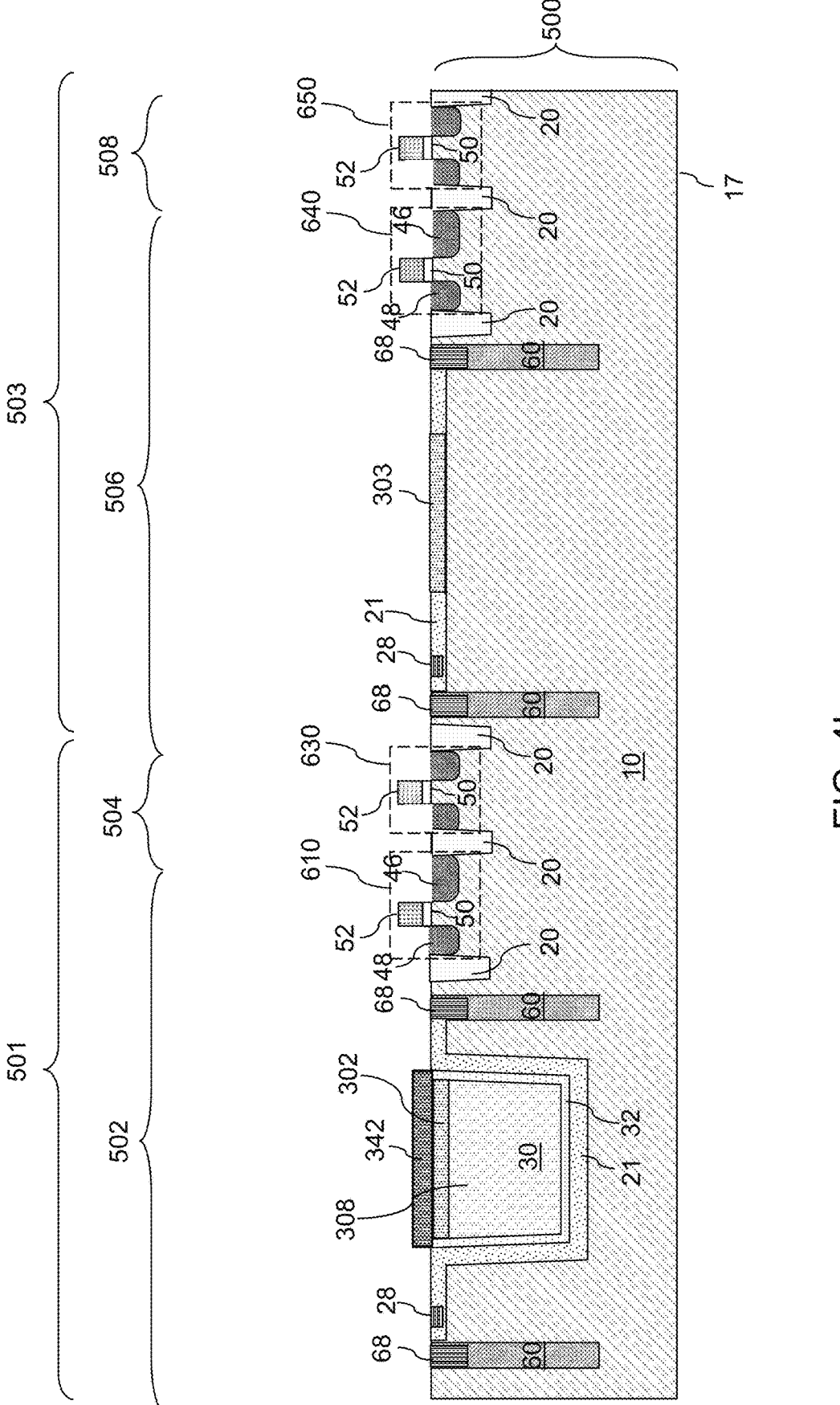

Referring to FIG. 4L, the dielectric mask layer 12 may be removed, for example, by performing a wet etch process. In embodiments in which the dielectric mask layer 12 includes silicon oxide, a wet etch process using dilute hydrofluoric acid may be performed to remove the dielectric mask layer 12.

Shallow trench isolation structures 20 may be formed in an upper portion of the semiconductor material layer 10. The shallow trench isolation structures 20 may include a dielectric fill material such as silicon oxide, and provide electrical isolation from semiconductor devices to be subsequently formed. Various field effect transistors (610, 630, 640, 650) may be formed in the first and second photodetector regions 502, 506 and in the first and second sensing circuit regions 504, 508. For example, transfer transistors 610, 640 may be formed in the first and second photodetector regions 502, 506, and field effect transistors 630, 650 may be formed in the first and second sensing circuit regions 504, 508. Each of the field effect transistors (610, 630, 640, 650) may include a respective gate dielectric 50, a respective gate electrode 52, and a respective pair of a source region and a drain region. The source regions and the drain regions are collectively referred to as source/drain regions. The transfer transistors 610, 640 may include a source region 48 that is electrically connected to the second-conductivity-type germanium-containing region 302 and the second-conductivity-type semiconductor material region 303, respectively, and a floating drain region 46. The floating drain regions 46 of the transfer transistors 610, 640 may have a doping of the second conductivity type. Various doped wells may be formed in the first and second sensing circuit regions 504, 508 as needed. While the present disclosure illustrates a single field effect transistor 630, 650 in each of the first and second sensing circuit regions 504, 508, it is understood that a full set of field effect transistors for providing sensing circuits for each photodetector may be formed in the first and second sensing circuit regions 504, 508. The field effect transistors in the first and second sensing circuit regions 504, 508 may include transistors such as a reset transistor, a source follower transistor, and a select transistor. Any sensing circuit for sensing stored electrical charges in the first photodetector region 502 and the second photodetector region 506 may be formed.

Figure 4M:
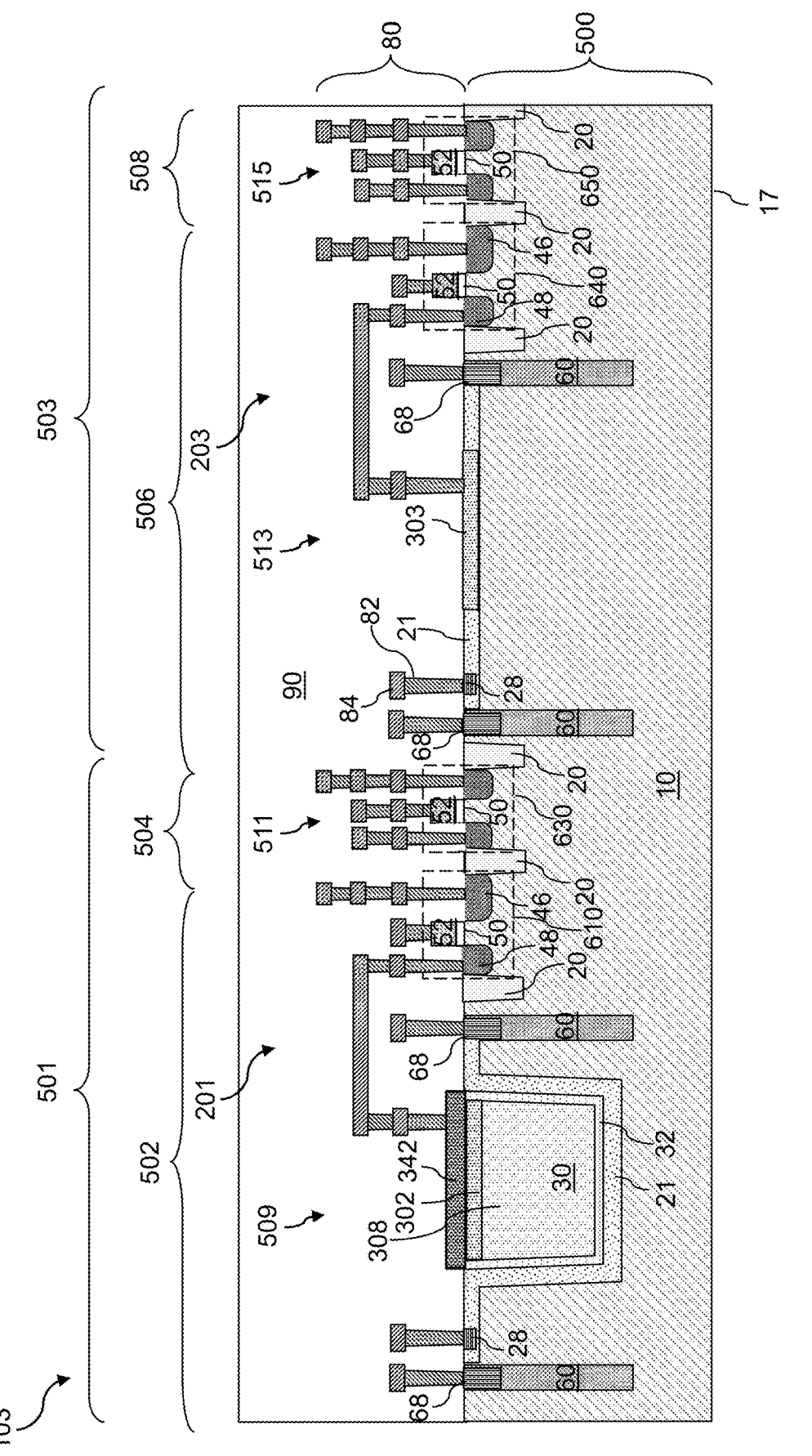

Referring to FIG. 4M, dielectric material layers 90 and metal interconnect structures 80 may be formed over the field effect transistors (610, 630, 640, 650) and the front surface 7 of the semiconductor material layer 10. Each of the dielectric material layers 90 may include a respective interlayer dielectric (ILD) material such as undoped silicate glass, a doped silicate glass, organosilicate glass, and/or a porous dielectric material. The dielectric material layers 90 may include dielectric liners such as silicon nitride dielectric liners, dielectric metal oxide dielectric liners, silicon carbide dielectric liners, and/or silicon oxynitride dielectric liners. The metal interconnect structures 80 may include metal via structures 82 and metal line structures 84. The transfer transistors 610, 640 may include source regions 48 that may be electrically connected to the second-conductivity-type germanium-containing region 302 in the first photodetector region 502 and the second-conductivity-type semiconductor material region 303 in the second photodetector region 506 by a subset of the metal interconnect structures 80.

Referring again to FIG. 4M, an image sensor 103 for a Time-of-Flight imaging system according to an embodiment of the disclosure may include a substrate 500 having primary sensor 201 on a first region 501 of the substrate 500, and a secondary sensor 203 on a second region 503 of the substrate. The primary sensor 201 may include a photodetector 509 in a first photodetector region 502 and a sensing circuit 511 in a first sensing circuit region 504, where the photodetector 509 of the primary sensor 201 includes a photovoltaic junction located at least partially in a germanium-based material that includes germanium at an atomic percentage greater than 50%. The secondary sensor 203 may include a photodetector 513 in a second photodetector region 506 and a sensing circuit 515 in a second sensing circuit region 508, where the photodetector 513 of the secondary sensor 203 includes a photovoltaic junction in a second material that includes germanium at an atomic percentage between 0% and 50%.

Figure 5:
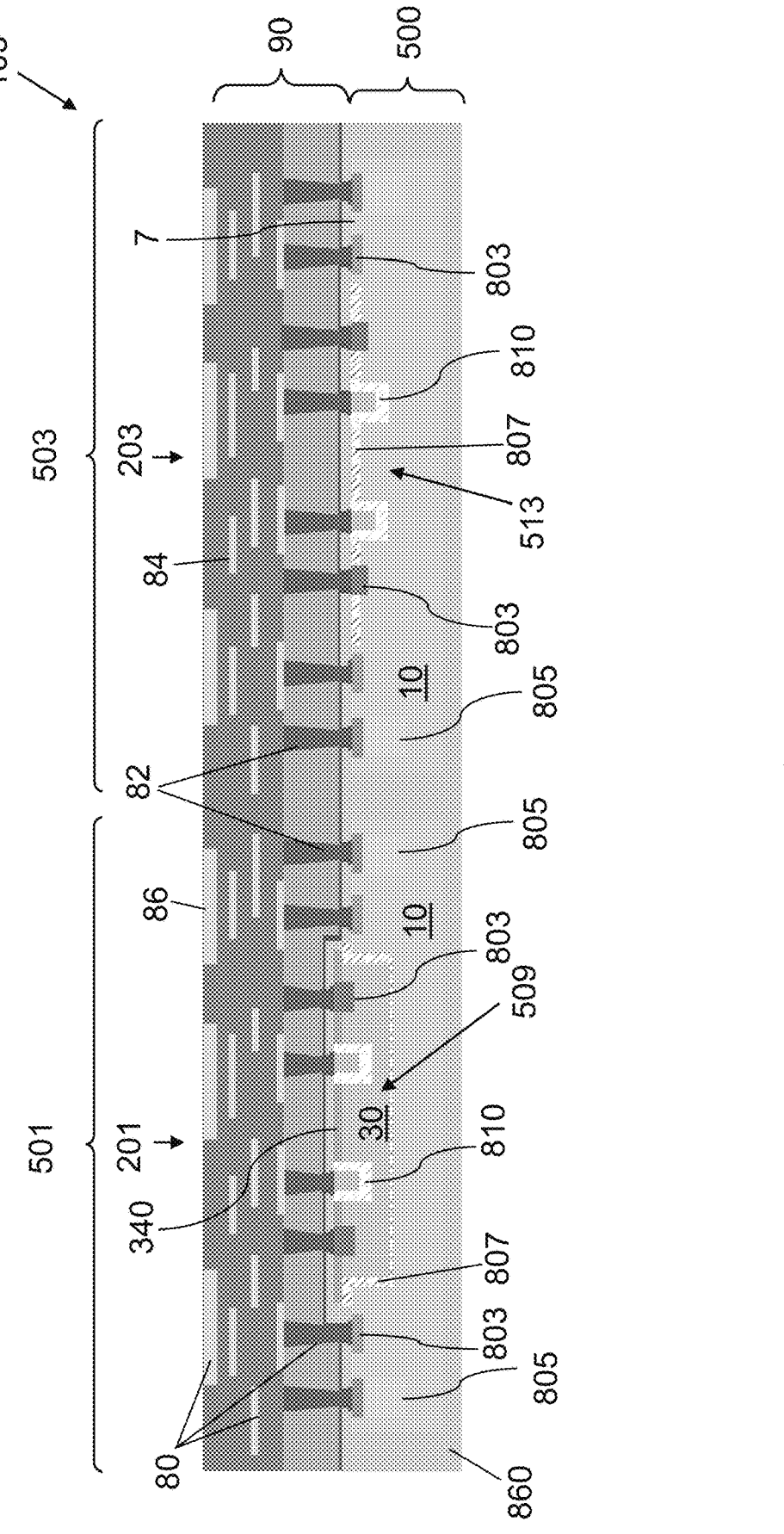
FIG. 5 is a vertical cross-section view of another exemplary structure of an image sensor for a ToF imaging system according to an embodiment of the disclosure.

FIG. 5 is a vertical cross-section view of another exemplary structure of an image sensor 103 for a ToF imaging system according to an embodiment of the disclosure. Referring to FIG. 5, the image sensor 103 includes a primary sensor 201 in a first region 501 of the substrate 500, and a secondary sensor 203 formed in a second region 503 of the substrate 500. As in the exemplary structure of FIG. 4M, dielectric material layers 90 and metal interconnect structures 80, including metal via structures 82, metal line structures 84, and metal bonding pads 86, may be formed over the front surface 7 of the semiconductor material layer 10. The exemplary structure shown in FIG. 5 differs from the exemplary structure shown in FIG. 4M in that the sensing circuits 511 for the photodetectors 509 and 513 are not located on the substrate 500. This may enable more of the area of the substrate 500 to be used for formation of photodetectors.

In exemplary structure illustrated in FIG. 5 and in contrast to the exemplary structure illustrated in FIG. 4M, the sensing circuits 511 may be subsequently formed and located over the dielectric material layer(s) 90. The sensing circuits 511 may be electrically connected to the photodetectors 509 and 513 via the metal interconnect structures 80 formed through the dielectric material layer(s) 90. In some embodiments of the exemplary structure illustrated in FIG. 5, the sensing circuits 511 may be formed over the dielectric material layer(s) 90. In alternative embodiments, all or a portion of the sensing circuits 511 may be formed on a separate substrate, such as a carrier substrate (not illustrated). The exemplary structure shown in FIG. 5 may be subsequently bonded to the separate substrate containing the sensing circuits 511.

Referring again to FIG. 5, the primary sensor 201 in the first region 501 of the substrate 500 may include a photodetector 509 including a photovoltaic junction located at least partially in a germanium-based material that includes germanium at an atomic percentage greater than 50%. The secondary sensor 203 in the second region 503 of the substrate 500 may include a photodetector 513 including a photovoltaic junction in a second material that includes germanium at an atomic percentage between 0% and 50%.

Each of the photodetectors 509 and 513 may include a plurality of doped regions, which may include doped wells 805, 807, 810 and/or doped contact regions 803. The doped regions may include dopants of the first conductivity type or dopants of the second conductivity type. In some embodiments, each of the photodetectors 509 and 513 may include at least one doped region of the first conductivity type and at least one doped region of the second conductivity type such that a photovoltaic junction, such as a p-i-n junction or p-n junction, is located within the photodetector 509, 513. In the embodiment shown in FIG. 5, a dielectric material 860, such as an oxide material, may be located below the bottom surface of the semiconductor material layer 10 of the substrate 500, and may laterally surround the semiconductor material layer 10 around the periphery of each photodetector 509, 513.

Figure 6:
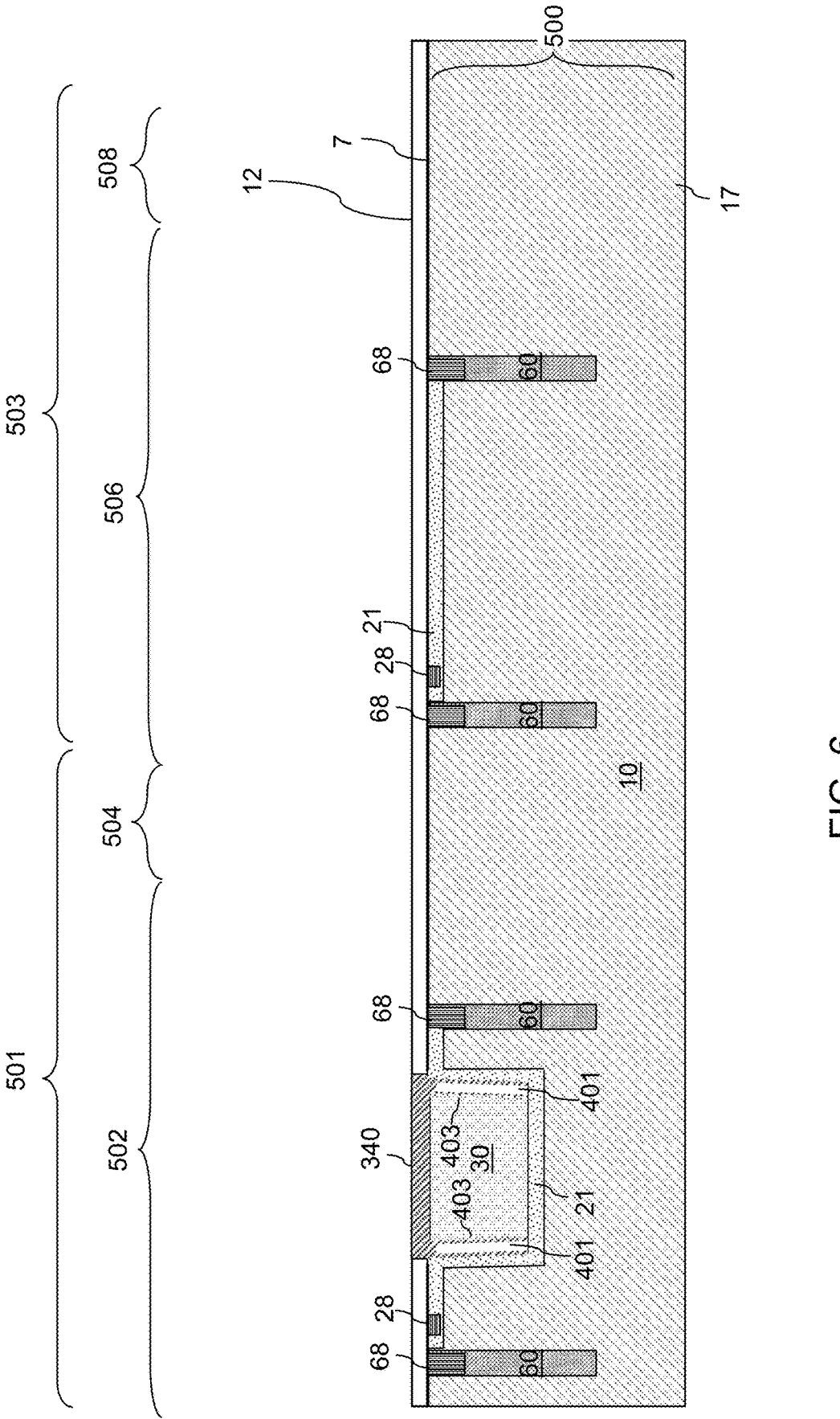
FIG. 6 is a vertical cross-sectional view illustrating an alternative configuration of the first exemplary structure according to an embodiment.

FIG. 6 is a vertical cross-sectional view of an alternative configuration of the first exemplary structure according an embodiment of the invention. Referring to FIG. 6, an alternative configuration of the first exemplary structure shown in FIG. 4J may be derived by performing an etching step around the sides of the germanium-based well 30 to provide a gap 401 between the germanium-based well 30 and the side walls of the trench 69. An anisotropic etch process may be used to remove material at the interface between the germanium-based well 30 and the semiconductor material liner 32 (in embodiments in which the semiconductor material liner 32 is included) or the first-conductivity-type semiconductor material region 21 (in embodiments in which the semiconductor material liner 32 is not included) so that the germanium-based well 30 is surrounded on its lateral sides by a gap 401. In the embodiment shown in FIG. 6, the semiconductor material liner 32 is not included for clarity. The etch process may expose a diffusion region 403 along the lateral side surfaces of the germanium-based well 30. The diffusion region 403 may be formed by the diffusion of dopants of the first conductivity type previously implanted through sidewalls of the trench 69 (see FIG. 4E) into peripheral regions of the germanium-based well 30.

The gap 401 formed around the lateral side walls of the germanium-based well 30 may have a width of 0.5 nm or more (e.g., 1 nm to 1000 nm). The etch process used to produce the gap 401 may also remove a portion of the dielectric mask layer 12 to expose a horizontally-extending portion of the first-conductivity-type semiconductor material region 21 surrounding the germanium-based well 30.

Following the formation of the gap 401, the germanium-based well 30 may contact the first-conductivity-type semiconductor material region 21 (or the semiconductor material liner 32 in embodiments in which the semiconductor material liner 32 is included) along the bottom horizontal surface of the trench 69, rather than other portions. The gap 401 around the lateral side surfaces of the germanium-based well 30 may minimize the formation of dislocations between the germanium-containing material of the germanium-based well 30 and the surrounding semiconductor material, which may be a silicon-based material. This may reduce dark current in, and thereby improve the performance of, the photodetector that will be formed in the first photodetector region 502.

Referring again to FIG. 6, silicon-containing capping material may be deposited on the physically exposed top surface of the germanium-based well 30, as described above with reference to FIG. 4J. In embodiments, the silicon-containing capping material may also be deposited over the exposed horizontally-extending portion of the first-conductivity-type semiconductor material region 21 surrounding the germanium-based well 30, and in embodiments in which a semiconductor material liner 32 is present, the silicon-containing capping material may be deposited on the top surface of the semiconductor material liner 32. The silicon-containing capping material may also form over the top of the gap 401 surrounding the lateral side surfaces of the germanium-based well 30, and optionally over the sidewalls of the gap 401, to provide a continuous passivation silicon region 340 extending over the top surface of the germanium-based well 30, the gap 401 surrounding the lateral side surfaces of the germanium-based well 30, the top surface of the semiconductor material liner 32 (if present), and the horizontally-extending portion of the first-conductivity-type semiconductor material region 21 surrounding the germanium-based well 30. The top surface of the passivation silicon region 340 may be located within the same horizontal plane as the top surface of the dielectric mask layer 12.

Subsequently, the processing steps of FIGS. 4K-4M may be performed to form photovoltaic junctions in each of the first and second photodetector regions 502, 506, shallow trench isolation structures 20 and field effect transistors (610, 630, 640, 650) in the first and second photodetector regions 502, 506 and dielectric material layers 90 and metal interconnect structures 80 over the field effect transistors (610, 630, 640, 650) and the front surface 7 of the semiconductor material layer 10 in the first region 501 and the second region 503 of the image sensor 103. Optionally, shallow trench isolation structures 20 and field effect transistors (610, 630, 640, 650) may not be formed on the substrate 500 to provide an exemplary structure as shown in FIG. 5.

Figure 7A:
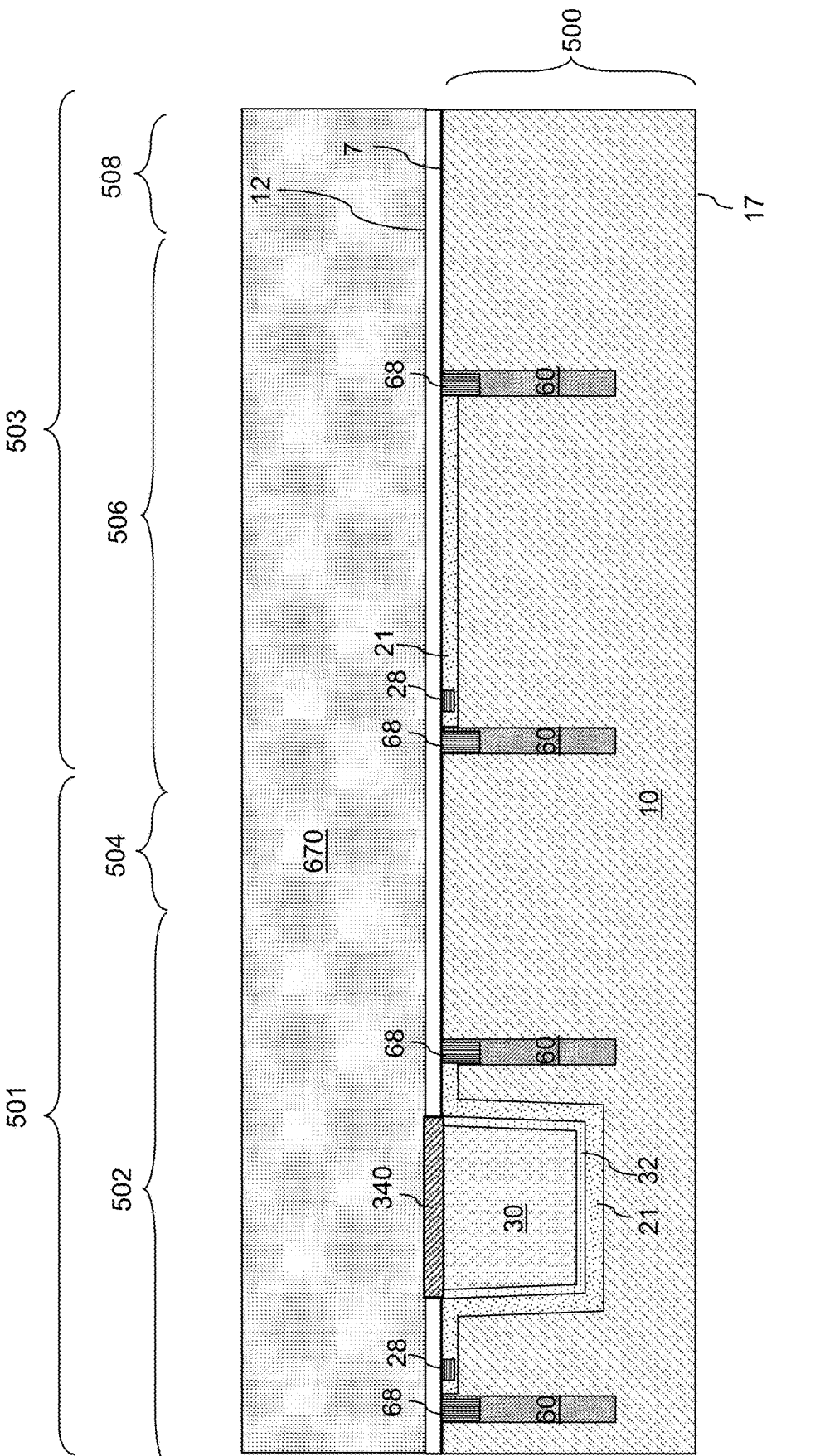
FIGS. 7A-7G are sequential vertical cross-sectional views of another alternative configuration of the first exemplary structure during formation of an image sensor according to an embodiment.
Figure 7B:
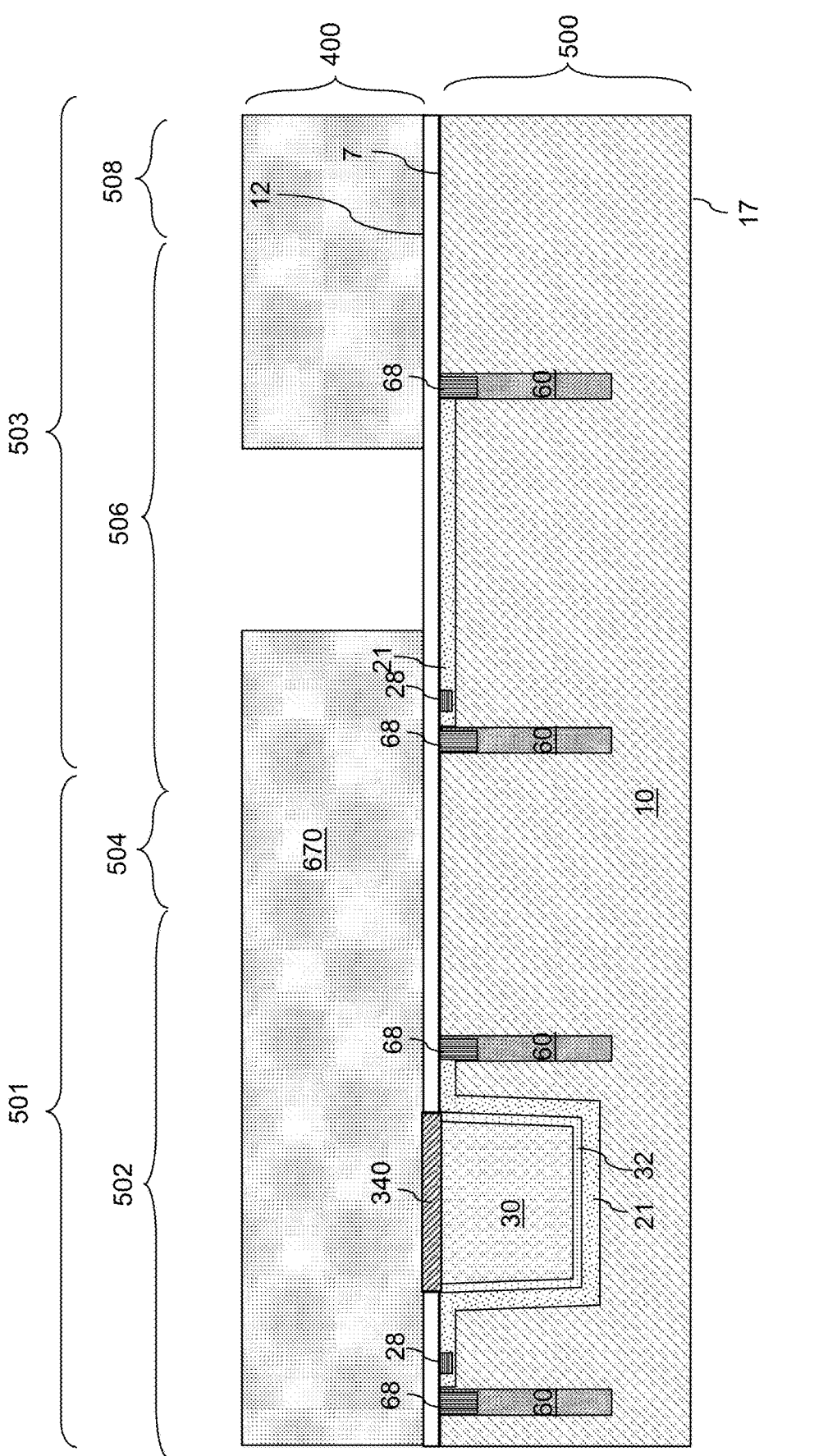

FIGS. 7A-7G are sequential vertical cross-sectional views of yet another alternative configuration of the first exemplary structure during formation of an image sensor according to an embodiment. Referring to FIG. 7A, an alternative configuration of the first exemplary structure shown in FIG. 4J may be derived by applying a photoresist layer 670 over the top surface 7 of the substrate 500. Referring to FIG. 7B, the photoresist layer 670 may be lithographically patterned to form an etch mask 600. The etch mask 600 may be formed using the methods described above with reference to FIGS. 4B and 4C. The etch mask 600 may extend over the first photodetector region 502, the first sensing circuit region 504 and the second sensing circuit region 508. However, the etch mask 600 may expose at least a portion of the second photodetector region 506. As shown in FIG. 7B, the etch mask 600 may include an opening within the area laterally enclosed by the second-conductivity-type doped well 60 in the second photodetector region 506.

Figure 7C:
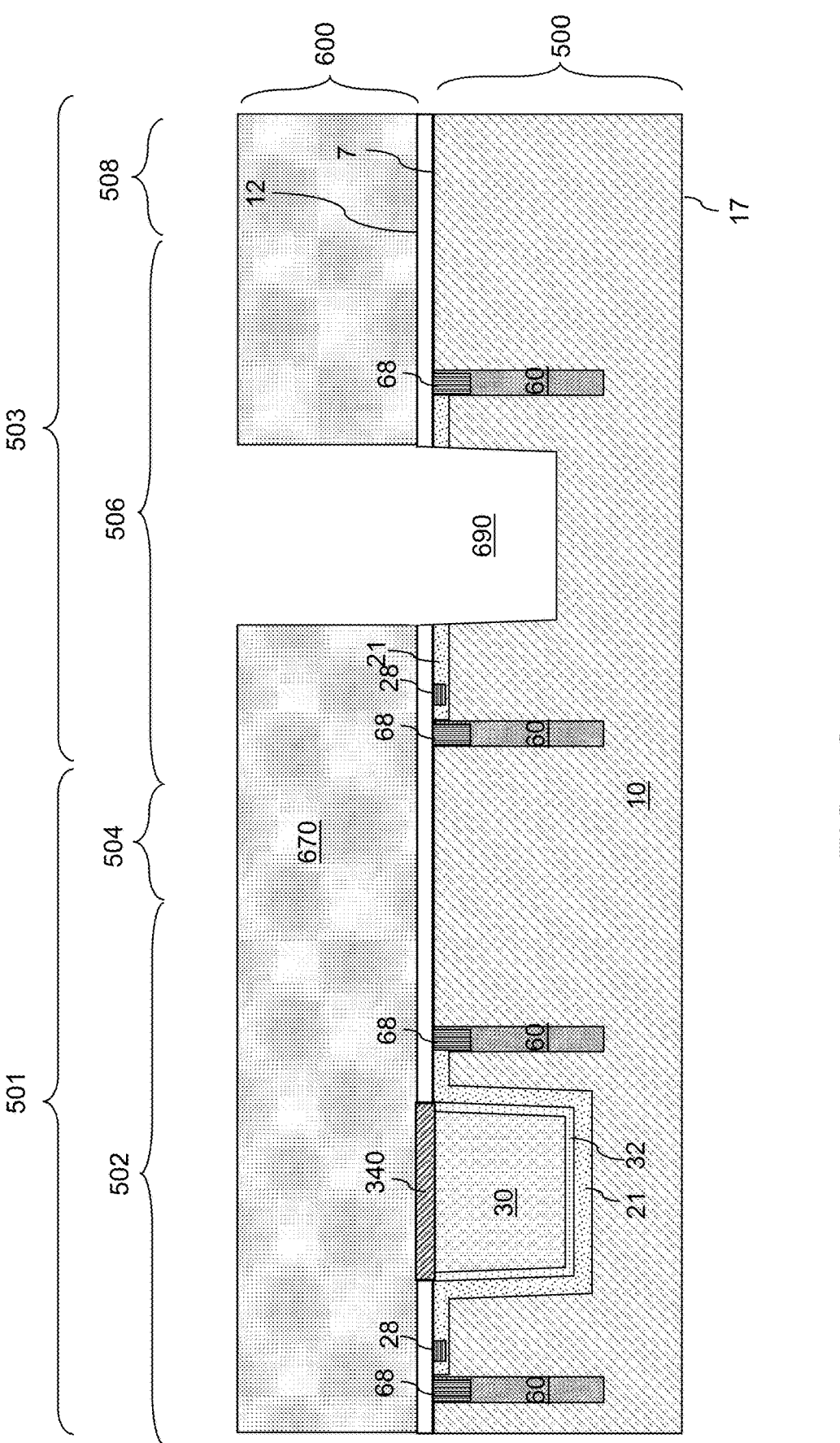

Referring to FIG. 7C, an anisotropic etch process may be performed to remove portions of the dielectric mask layer 12 and the semiconductor material layer 10 to form a trench 690 in the second photodetector region 506. During the etch process, the etch mask 600 may protect the first photodetector region 502, the first sensing circuit region 504 and the second sensing circuit region 508 from being etched.

The trench 690 formed in the second photodetector region 506 may be laterally enclosed by, and laterally spaced inward from, the second-conductivity-type doped well 60. The trench 690 may have the same dimensions as the trench 69 formed in the first photodetector region 502 or may have different dimensions. In one embodiment, the depth of the trench 690 may be in a range from 0.5 micron to 10 microns, such as from 1 micron to 6 microns, although lesser and greater depths may also be used. The lateral dimension of the trench 690 may be in a range from 0.5 micron to 30 microns, such as from 1 micron to 15 microns, although lesser and greater lateral dimensions may also be used. The lateral dimension of the trench 690 may be the diameter or the major axis of the horizontal cross-sectional shape of the trench 690 in embodiments in which the trench 690 has a circular or an elliptical horizontal cross-sectional shape, or may be the length of a side of a rectangular shape in embodiments in which the horizontal cross-sectional shape of the trench 690 is the rectangular shape. The etch mask 600 may be subsequently removed, for example, by ashing.

Figure 7D:
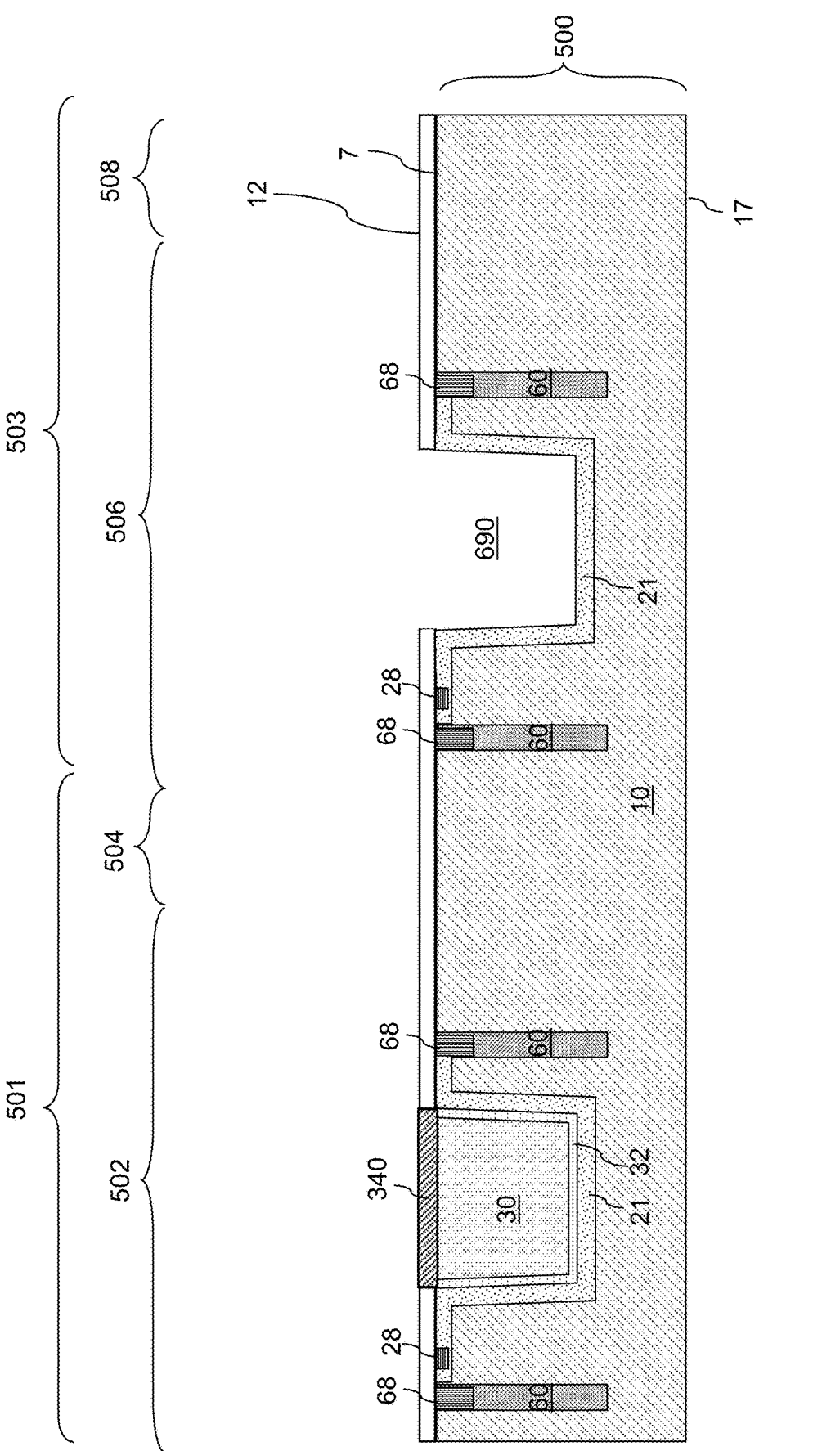

Referring to FIG. 7D, dopants of the first conductivity type may be implanted within the trench 690 in the second photodetector region 506. A multiple angled ion implantation process may be performed to implant the dopants of the first conductivity type through sidewalls of the trench 690. In addition, the dopants of the first conductivity type may be implanted into a horizontal portion of the semiconductor material layer 10 that underlies the bottom surface of the trench 690. The implantation of dopants of the first conductivity type within the trench 690 may extend the first-conductivity-type semiconductor material region 21 around the sidewalls and underneath the bottom surface of the trench 690. The lateral width of the first-conductivity-type semiconductor material region 21 around each sidewall of the trench 690 may be in a range from 100 nm to 1,000 nm, although lesser and greater lateral dimensions may also be used. The thickness of the horizontal portion of the first-conductivity-type semiconductor material region 21 underneath the bottom surface of the trench 690 may be in a range from 100 nm to 1,000 nm, although lesser and greater thicknesses may also be used.

Figure 7E:
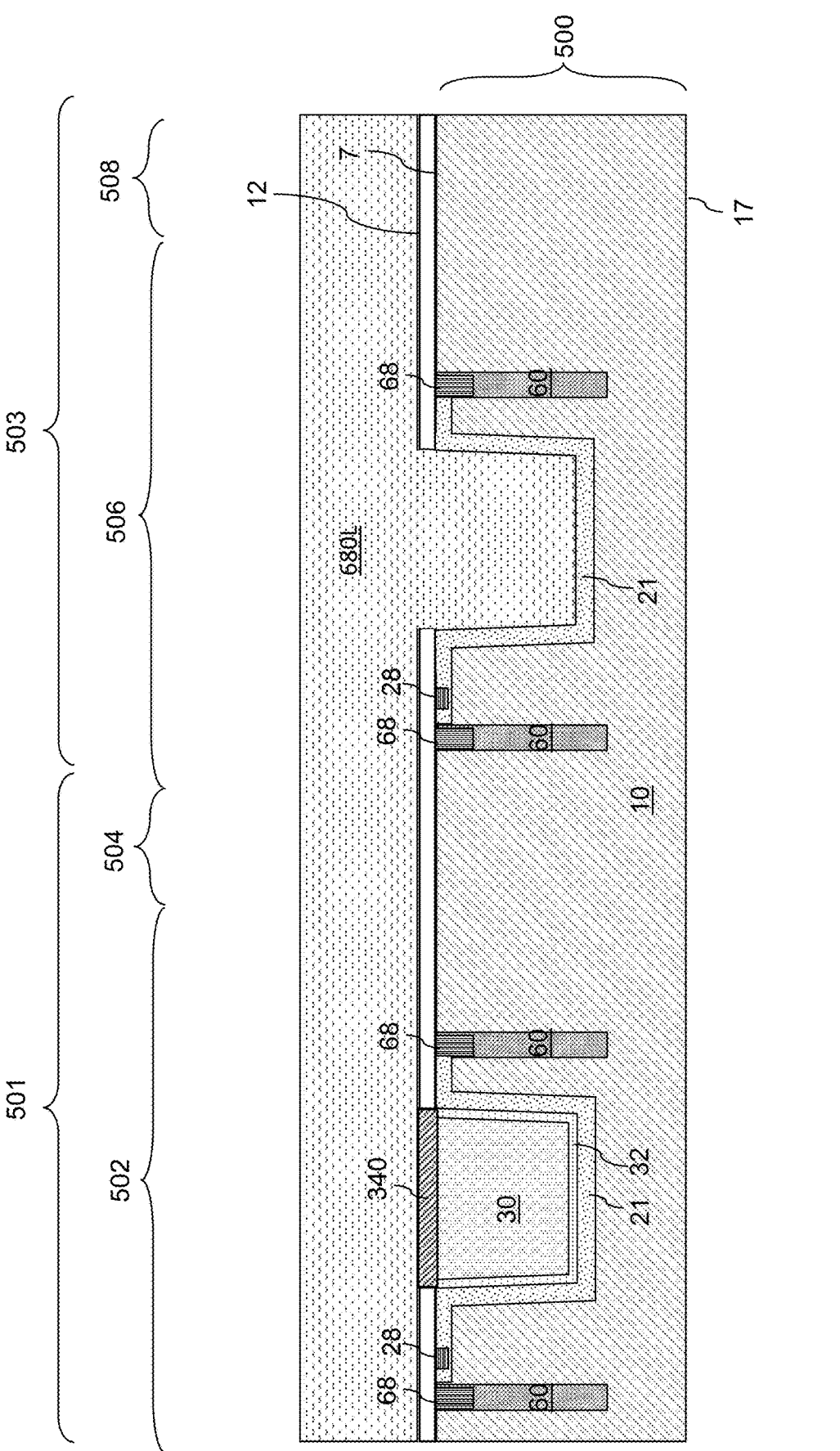

Referring to FIG. 7E, a semiconductor material may be grown from the physically exposed surfaces of the first-conductivity-type semiconductor material region 21. The semiconductor material may include germanium at an atomic percentage between 0% and 50%. In one embodiment, the semiconductor material may be a silicon-containing material. The silicon-containing material may include doped or undoped silicon such that the atomic percentage of silicon is at least 99%, and is basically or essentially free of germanium or other elements. In another embodiment, the silicon-containing material may include a silicon-germanium alloy in which the atomic percentage of silicon is greater than 50%, and the atomic percentage of germanium is less than 50%. In some embodiments, the deposited semiconductor material may include one or more of magnalium spinel carbon bricks, yttrium oxide, and al-oxynitride. A semiconductor material layer 680L may be formed by the deposited semiconductor material.

The deposited semiconductor material layer 680L may be the same or different material than the material of the semiconductor material layer 10 of the substrate 500. In one embodiment, the materials of semiconductor material layer 680L and semiconductor material layer 10 may differ by one or more of crystalline structure, chemical composition, dopant type and dopant concentration. For example, the semiconductor material layer 10 of the substrate 500 may be polycrystalline silicon and the deposited semiconductor material layer 680L may be single crystalline silicon. In another example, the semiconductor material layer 10 of the substrate 500 may be silicon that is substantially free of other elements, and the semiconductor material layer 680L may include a silicon-containing alloy, such as a silicon-germanium alloy. In a further example, the semiconductor material layer 10 of the substrate 500 may have a doping of a first conductivity type, and the semiconductor material layer 680L may be intrinsic, or may have a comparatively lower level of doping.

The semiconductor material layer 680L may be formed by a selective deposition process or a non-selective deposition process, as described above with reference to FIG. 4G. In one embodiment, the selective deposition process or the non-selective deposition process that is used to deposit the semiconductor material layer 680L may be an epitaxial deposition process that provides alignment of crystallographic structure of the deposited semiconductor material to the crystalline structure at the physically exposed surfaces of the underlying material portions. Thus, the portion of the semiconductor material layer 680L that is deposited in the trench 690 may be epitaxially aligned to the crystalline structure of the first-conductivity-type semiconductor material region 21. In embodiments, the entirety of the semiconductor material layer 680L may be single crystalline and may be in epitaxial alignment with the semiconductor material layer 10 of the substrate, which may also be single crystalline. In embodiments in which a non-selective epitaxial deposition process is used to deposit the semiconductor material layer 680L, the material of the semiconductor material layer 680L may grow not only from the physically exposed semiconductor material surfaces (e.g., the exposed surfaces of the trench 690), but may also grow from the physically exposed surfaces of the dielectric mask layer 12. In these embodiments, only the portion(s) of the semiconductor material layer 680L that grow from the physically exposed surfaces of single crystalline semiconductor material may be single crystalline, and other portions of the semiconductor material layer 680L may be polycrystalline.

Generally, an epitaxial deposition process may be performed to grow a single crystalline semiconductor material inside the trench 690. At least the portion of the semiconductor material layer 680L that grows within the trench 69 may be single crystalline, and may be formed with epitaxial alignment with single crystalline material of the single crystalline semiconductor material substrate 10. In this embodiment, the entirety of the portion of the semiconductor material layer 680L located within the trench 69 may be single crystalline.

The semiconductor material layer 680L may be intrinsic, or may have a low level of doping. For example, the atomic concentration of dopants within the semiconductor material layer 680L may be in a range from $1.0\times10^{13}/cm^3$ to $1.0\times10^{18}/cm^3$, although lesser and greater dopant concentrations may also be used.

Figure 7F:
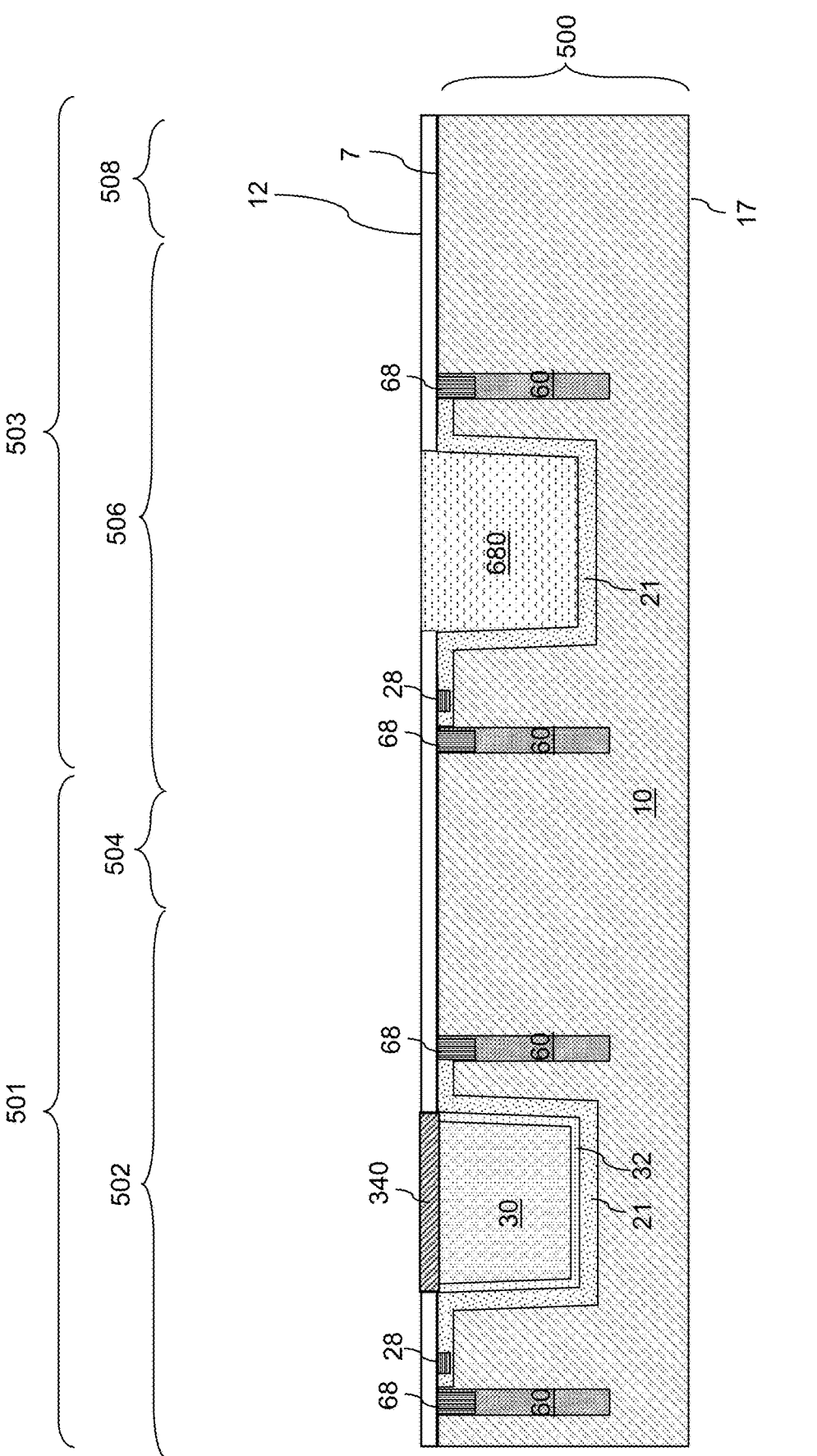

Referring to FIG. 7F, excess portions of the semiconductor material layer 680L may be removed from above the horizontal plane including the top surface of the dielectric mask layer 12. In one embodiment, a chemical mechanical planarization (CMP) process may be performed to remove portions of the semiconductor material layer 680L located above the horizontal plane including the top surface of the dielectric mask layer 12. A remaining portion of the semiconductor material layer 680L located within the trench 690 comprises a semiconductor material portion, which is herein referred to as a semiconductor material well 680. The semiconductor material well 680 may have a top surface within the same horizontal plane as the top surface of the dielectric mask layer 12.

While the present disclosure is described using an embodiment in which the semiconductor material well 680 is formed as a single crystalline semiconductor material portion, such as a single crystalline silicon material portion, the semiconductor material well 680 may be formed as a polycrystalline material portion or as an amorphous material portion albeit at a reduced efficiency. Such variations are expressly contemplated herein.

In a further embodiment, the semiconductor material layer 680L may be deposited after a portion of the germanium-containing material in the germanium-based well 30 is vertically recessed, as shown in FIG. 4I above, but prior to the formation of a silicon-containing capping material on the physically exposed top surface of the germanium-based well 30, as shown in FIG. 4J. In such an embodiment, the semiconductor material layer 680L, which may include a silicon-containing material, may be deposited over both the exposed semiconductor material surfaces of the trench 690, as well as over the exposed germanium-containing material on the top surface of the germanium-based well 30. Excess portions of the semiconductor material layer 680L may be removed from above the horizontal plane including the top surface of the dielectric mask layer 12 to form both the semiconductor material well 680 in the second photodetector region 506, and the passivation silicon region 340 in the first photodetector region 502.

Figure 7G:
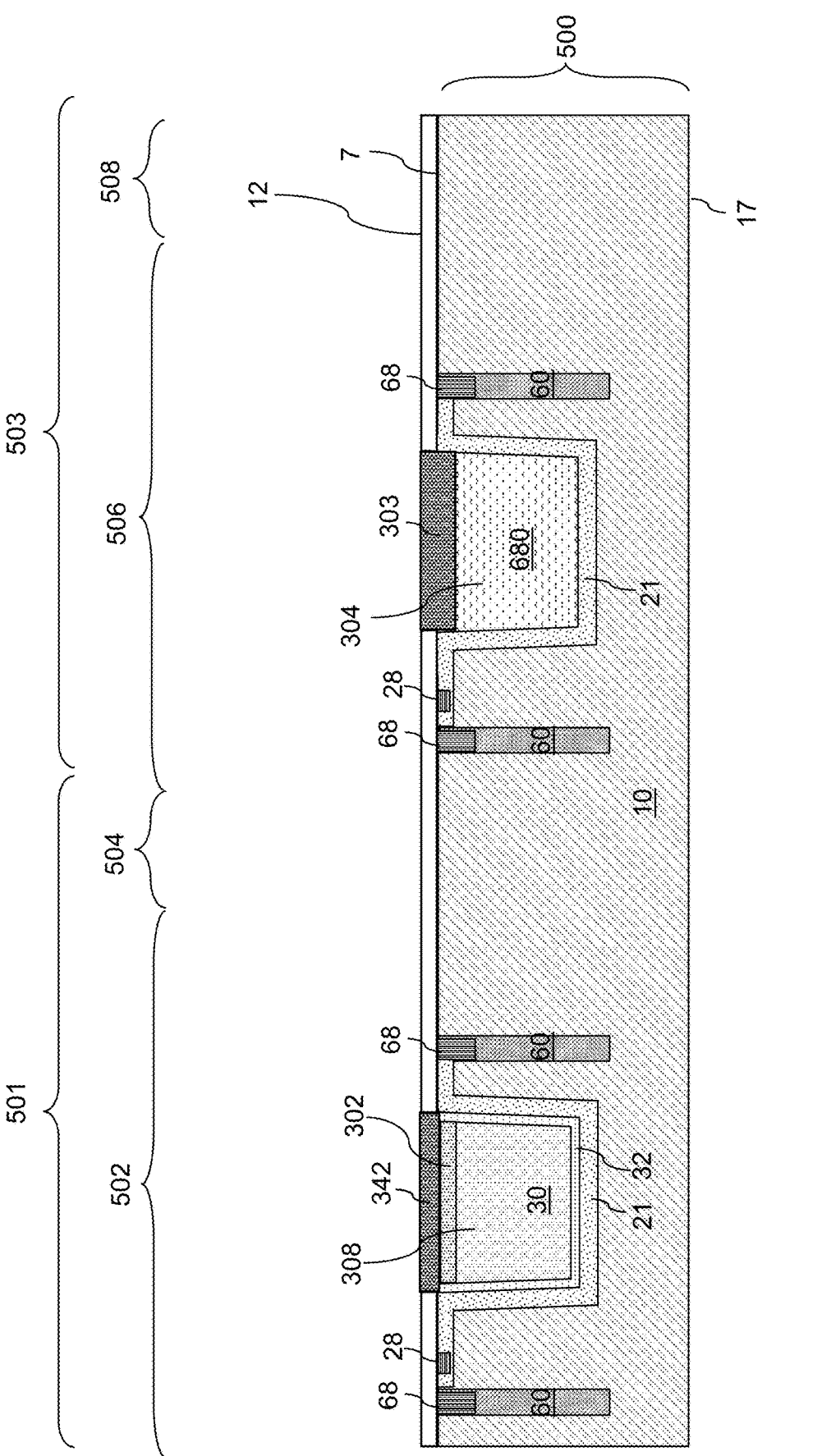

Referring to FIG. 7G, dopants of the second conductivity type may be implanted into an upper portion of the semiconductor material well 680 in the second photodetector region 506. The implanted portion of the semiconductor material well 680 may be converted into a second-conductivity-type semiconductor material region 303. The atomic concentration of electrical dopants of the second conductivity type in the second-conductivity-type semiconductor material region 303 may be in a range from $1.0\times10^{18}/cm^3$ to $1.0\times10^{21}/cm^3$, although lesser and greater atomic concentrations may also be used. The thickness of the second-conductivity-type semiconductor material region 303 may be in a range from 50 nm to 500 nm, although lesser and greater thicknesses may also be used.

The un-implanted portion of the semiconductor material well 680 may be an intermediate semiconductor material region 304. The intermediate semiconductor material region 304 may be intrinsic or may have a doping with an atomic concentration of dopants in a range from $1.0\times10^{13}/cm^3$ to $1.0\times10^{18}/cm^3$. The intermediate semiconductor material region 304 may contact the second-conductivity-type the second-conductivity-type semiconductor material region 303, and may be laterally surrounded by the first-conductivity-type semiconductor material region 21.

The first-conductivity-type semiconductor material region 21, the intermediate semiconductor material region 304, and the second-conductivity-type semiconductor material region 303 may collectively form a p-i-n type photovoltaic junction, i.e., a photovoltaic junction including a p-doped region, an n-doped region, and an intermediate semiconductor region located between the p-doped region and the n-doped region and including an intrinsic semiconductor material or a lightly-doped semiconductor material. In one embodiment, the first conductivity type may be p-type and the second conductivity type may be n-type. In another embodiment, the first conductivity type may be n-type and the first conductivity type may be p-type. The photovoltaic junction may be formed across the trench 690, i.e., may spatially extend across the boundary of the trench 690 due to the presence of the first-conductivity-type semiconductor material region 21 outside the trench 69.

In an alternative embodiment, the intermediate semiconductor material region 304 may have a doping of the second conductivity type, and the photovoltaic junction may include a p-n junction formed between the intermediate semiconductor material region 304 and the first-conductivity-type semiconductor material region 21. In this embodiment, the intermediate semiconductor material region 304 may include dopants of the second conductivity type at an atomic concentration in a range from $1.0\times10^{17}/cm^3$ to $1.0\times10^{20}/cm^3$, although lesser and greater atomic concentrations may also be used. Generally, the photovoltaic junction may comprise a p-i-n junction or a p-n junction formed across the semiconductor material well 680 and the semiconductor material layer 10 that contains the first-conductivity-type semiconductor material region 21.

The implantation of dopants of the second conductivity type in the upper portion of the semiconductor material well 680 in the second photodetector region 506 may occur during the same implantation step, or in a separate implantation step, as the implantation of dopants of the second conductivity type into the passivation silicon region 340 and the upper portion of the germanium-based well 30 in the first photodetector region 502, as described above with reference to FIG. 4K. The implantation of dopants of the second conductivity type in the first photodetector region 502 and the implantation of dopants of the second conductivity type in second photodetector region 506 may use the same or different dopant materials, implantation energies, implantation depths, and/or dopant concentrations.

Subsequently, the processing steps of FIGS. 4L and 4M may be performed to form shallow trench isolation structures 20 and field effect transistors (610, 630, 640, 650) in the first and second photodetector regions 502, 506 and dielectric material layers 90 and metal interconnect structures 80 over the field effect transistors (610, 630, 640, 650) and the front surface 7 of the semiconductor material layer 10 in the first region 501 and the second region 503 of the image sensor 103. Optionally, shallow trench isolation structures 20 and field effect transistors (610, 630, 640, 650) may not be formed on the substrate 500 to provide an exemplary structure as shown in FIG. 5.

Although the embodiment of FIGS. 7A-7G includes the formation of a germanium-based well 30 in the first photodetector region 502 occurring prior to the formation of a semiconductor-material well 680 in the second photodetector region 506, various alternative fabrication processes are within the contemplated scope of disclosure. In other embodiments, the semiconductor-material well 680 may be formed in the second photodetector region 506 prior to the formation of the germanium-based well 30 in the first photodetector region 502. An etch mask 400, such as shown in FIG. 4C, may protect the semiconductor material well 680 from being etched during the formation of the trench 69 in the first photodetector region 502.

In a further embodiment, the trench 69 in the first photodetector region 502 and the trench 690 in the second photodetector region 506 may be formed during the same etching step. Subsequently, a germanium-containing first semiconductor material may be deposited within the trench 69 in the first photodetector region 502 to form a germanium-based well 30 and a second semiconductor material may be deposited within the trench 690 in the second photodetector region 506 to form the semiconductor material well 680.

In a further embodiment, the trench 69 in the first photodetector region 502 and the trench 690 in the second photodetector region 506 may be formed during the same etching step. Subsequently, a germanium-containing first semiconductor material may be deposited within the trench 69 in the first photodetector region 502 to form a germanium-based well 30 and a second semiconductor material may be deposited within the trench 690 in the second photodetector region 506 to form the semiconductor material well 680.

In a still further embodiment, the semiconductor material layer 10 of the substrate 500 may include a germanium-based material, and the photodetector 509 in the first pho-todetector region 502 may be formed in the semiconductor material layer 10 without the need to form a germanium-based well 30 in the first photodetector region 502. In such an embodiment, the process steps of FIGS. 7A-7G may be performed to form the semiconductor material well 680 in the second photodetector region 506.

In a still further embodiment, the semiconductor material layer 10 of the substrate 500 may include a germanium-based material, and the photodetector 509 in the first pho-todetector region 502 may be formed in the semiconductor material layer 10 without the need to form a germanium-based well 30 in the first photodetector region 502. In such an embodiment, the process steps of FIGS. 7A-7G may be performed to form the semiconductor material well 680 in the second photodetector region 506.

FIG. 8 is a flowchart illustrating a general method 800 of fabricating an image sensor 103 for a Time-of-Flight imaging system 100. Referring to FIG. 4A, in step 801 of method 800, a substrate 500 including a semiconductor material layer 10 may be provided. Referring to FIGS. 4B-4M, 5, 6, and 7A-7G, in step 802, a plurality of photodetectors 201, 203 may be formed on the substrate 500, including at least one photodetector 201 having a photovoltaic junction located at least partially in a first semiconductor material 30 that includes germanium at an atomic percentage greater than 50%, and at least one photodetector having a photovoltaic junction located in a second semiconductor material 10, 680 that includes germanium at an atomic percentage between 0% and 50%.

Referring to all drawings and according to various embodiments of the present disclosure, a Time-of-Flight imaging system 100 is provided, where the Time-of-Flight imaging system 100 includes an illumination unit 101 configured to emit light signals, an image sensor 103 that detects the light signals from the illumination unit 101 that are reflected from one or more objects in a field-of-view of the image sensor 103 and are received at the image sensor 103, and a processor 107 configured to determine distance information for the one or more objects based on the light signals detected at the image sensor 103. The image sensor 103 of the Time-of-Flight system 100 includes an array 1000 of sensor elements 201, 203, each sensor element 201, 203 including a photodetector and a sensing circuit, and the array 1000 includes a plurality of primary sensor elements 201 and at least one secondary sensor element 203, where each primary sensor element 201 includes a photodetector that includes a photovoltaic junction formed at least partially in a germanium-containing material that includes germanium at an atomic percentage greater than 50%, and each secondary sensor element 203 includes a photodetector that includes a photovoltaic junction formed in a second material that includes germanium at an atomic percentage between 0% and 50%.

In one embodiment Time-of-Flight imaging system, the second material is a silicon-containing material.

In one embodiment Time-of-Flight imaging system, the plurality of primary sensor elements 201 detect the light signals from the illumination unit 101 that are reflected from one or more objects in a field-of-view of the image sensor 103 and are received at the image sensor 103, and the at least one secondary sensor element 203 detects background light.

In one embodiment Time-of-Flight imaging system, the processor 107 is configured to correct for noise due to the background light detected by the at least one secondary sensor element 203 when determining distance information for the one or more objects based on the light signals detected at the image sensor 103.

In one embodiment Time-of-Flight imaging system, the array 1000 includes a plurality of pixels 900, where each pixel 900 of the array 1000 includes either a primary sensor element 201 or a secondary sensor element 203, and the number of pixels 900 of the array 1000 that include a primary sensor element 201 is greater than or equal to the number of pixels 900 in the array 1000 that include a secondary sensor element 203.

In one embodiment Time-of-Flight imaging system, the array 1000 includes a plurality of pixels 900, where at least one pixel 900 of the array 1000 includes a plurality of subpixels, each subpixel including either a primary sensor element 201 or a secondary sensor element 203, and the number of subpixels of the array 1000 including a primary sensor element 201 is equal to or greater than the number of subpixels of the array 1000 including a secondary sensor element 201.

In one embodiment Time-of-Flight imaging system, the illumination unit 101 emits light signals in the infrared wavelength range.

In one embodiment Time-of-Flight imaging system, the photodetectors of the primary sensor elements 201 and the at least one secondary sensor element 203 comprise at least one of photodiodes, complimentary metal-oxide-semiconductor (CMOS) image sensors, and charged coupling device (CCD) sensors.

In one embodiment Time-of-Flight imaging system, the array 1000 of sensor elements 201, 203 are located on a substrate 500 having a semiconductor material layer 10 and at least one well 30, 680 embedded in the semiconductor material layer 10 of the substrate 500.

In one embodiment Time-of-Flight imaging system, the semiconductor material layer 10 of the substrate 500 includes a silicon-containing material that includes germanium at an atomic percentage between 0% and 50%, and the at least one well 30 contains the germanium-containing material of a photodetector of a primary sensor element 201.

In one embodiment Time-of-Flight imaging system, a gap 401 is located around the lateral side surfaces of the well 30 so that the germanium-containing material of the well 30 does not contact the silicon-containing material of the semiconductor material layer 10 of the substrate 500 around the lateral side surfaces of the well 30.

Another embodiment is drawn to an image sensor 103 for a Time-of-Flight imaging system 100 that includes a substrate 500, a primary sensor 201 on a first region 501 of the substrate 500, and a secondary sensor 203 on a second region of the substrate 500. The primary sensor 201 includes a photodetector in a first photodetector region 502, where the photodetector of the primary sensor 201 includes a photovoltaic junction located at least partially in a germanium-containing material that includes germanium at an atomic percentage greater than 50%. The secondary sensor 203 includes a photodetector in a second photodetector region 506, where the photodetector of the secondary sensor 203 includes a photovoltaic junction in a second material that includes germanium at an atomic percentage between 0% and 50%.

In one embodiment image sensor, the second material is a silicon-containing material.

In one embodiment image sensor, the second material is a silicon-germanium alloy that includes germanium at an atomic percentage between 0% and 50%.

In one embodiment image sensor, the substrate 500 includes a semiconductor material layer 10 and at least one well 30, 680 embedded in the semiconductor material layer 10 of the substrate 500.

In one embodiment image sensor, the semiconductor material layer 10 of the substrate 500 includes a silicon-containing material that includes germanium at an atomic percentage between 0% and 50%, and a well 30 is located in the first photodetector region 502 and contains the germanium-containing material of the photodetector of the primary sensor 201.

In one embodiment image sensor, a gap 401 is located around the lateral side surfaces of the well 30 so that the germanium-containing material of the well 30 does not contact the silicon-containing material of the semiconductor material layer 10 of the substrate 500 around the lateral side surfaces of the well 30, and a silicon-containing capping layer 340 is located over the germanium-containing material of the well 30 and the gap 401 around the lateral side surfaces of the well 30.

In one embodiment image sensor, a well 680 is located in the second photodetector region 506 and contains the second material of the photodetector of the secondary sensor 203.

Another embodiment is drawn to a method of fabricating an image sensor 103 for a Time-of-Flight imaging system 100 that includes providing a substrate 500 including a semiconductor material layer 10, and forming a plurality of photodetectors 201, 203 on the substrate 500, including at least one photodetector 201 having a photovoltaic junction located at least partially in a first semiconductor material that includes germanium at an atomic percentage greater than 50%, and at least one photodetector 203 having a photovoltaic junction located in a second semiconductor material that includes germanium at an atomic percentage between 0% and 50%.

In one embodiment, the method additionally includes forming a trench 69, 690 in the semiconductor material layer 10 of the substrate 500, and forming a well 30, 680 in the trench 69, 690, wherein the well 30, 680 contains the first semiconductor material or the second semiconductor material embedded in the semiconductor material layer 10 of the substrate 500.

By forming an image sensor 103 for a Time-of-Flight imaging system 100 that includes at least one primary sensor 201 having a photodetector that includes a photovoltaic junction formed at least partially in a germanium-containing material that includes germanium at an atomic percentage greater than 50%, and at least one secondary sensor 203 having a photodetector that includes a photovoltaic junction formed in a second material that includes germanium at an atomic percentage between 0% and 50%, the amount of background light interference may be monitored and corrected for during Time-of-Flight measurements, thereby improving the accuracy of the Time-of-Flight system.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A Time-of-Flight imaging system, comprising:

an illumination unit configured to emit light signals;

an image sensor that detects the light signals from the illumination unit that are reflected from one or more objects in a field-of-view of the image sensor and are received at the image sensor; and a processor configured to determine distance information for the one or more objects based on the light signals detected at the image sensor, wherein:

the image sensor comprises an array of sensor elements, each sensor element including a photodetector and a sensing circuit, and the array includes a plurality of primary sensor elements and at least one secondary sensor element, where each primary sensor element includes a photodetector that includes a photovoltaic junction formed at least partially in a germanium-containing material that includes germanium at an atomic percentage greater than 50%, and each secondary sensor element includes a photodetector that includes a photovoltaic junction formed in a second material that includes germanium at an atomic percentage between 0% and 50%;

the array of sensor elements are located on a substrate having a semiconductor material layer and a first well embedded in the semiconductor material layer of the substrate;

the semiconductor material layer of the substrate comprises a silicon-containing material that includes germanium at an atomic percentage between 0% and 50%, and the first well comprises the germanium-containing material of a photodetector of a primary sensor element, the semiconductor material layer of the substrate comprising a first-conductivity-type semiconductor material region surrounding a bottom surface and side surfaces of the first well; and a semiconductor material liner disposed between the semiconductor material layer and the first well, the semiconductor material liner extending on the bottom surface and the side surfaces of the first well.

2. The Time-of-Flight imaging system of claim 1, wherein the second material is a silicon-containing material, and the semiconductor material liner has a thickness in a range from 10 nm to 100 nm.

3. The Time-of-Flight imaging system of claim 1, wherein the plurality of primary sensor elements detect the light signals from the illumination unit that are reflected from one or more objects in a field-of-view of the image sensor and are received at the image sensor, and the at least one secondary sensor element detects background light.

4. The Time-of-Flight imaging system of claim 3, wherein the processor is configured to correct for noise due to the background light detected by the at least one secondary sensor element when determining distance information for the one or more objects based on the light signals detected at the image sensor.

5. The Time-of-Flight imaging system of claim 1, wherein the array of sensor elements comprises a plurality of pixels, wherein each pixel of the array of sensor elements includes either a primary sensor element or a secondary sensor element, and a number of pixels of the array that include a primary sensor element is greater than or equal to a number of pixels in the array that include a secondary sensor element.

6. The Time-of-Flight imaging system of claim 1, wherein the array of sensor elements comprises a plurality of pixels, wherein at least one pixel of the array includes a plurality of subpixels, each subpixel including either a primary sensor element or a secondary sensor element, and a number of subpixels of the array including a primary sensor element is equal to or greater than a number of subpixels of the array including a secondary sensor element.

7. The Time-of-Flight imaging system of claim 1, wherein the illumination unit emits light signals in the infrared wavelength range.

8. The Time-of-Flight imaging system of claim 1, wherein the photodetector of the primary sensor element and the at least one secondary sensor element comprise at least one of photodiodes, complimentary metal-oxide-semiconductor (CMOS) image sensors, and charged coupling device (CCD) sensors.

9. The Time-of-Flight imaging system of claim 1, wherein a gap is located on lateral side surfaces of the first well so that the germanium-containing material of the first well does not contact the silicon-containing material of the semiconductor material layer of the substrate on the lateral side surfaces of the first well, wherein the gap spaced from the semiconductor material layer of the substrate having a width of 0.5 nm or more.

10. A Time-of-Flight imaging system, comprising:

an illumination unit configured to emit light signals;

an image sensor that detects the light signals from the illumination unit that are reflected from one or more objects in a field-of-view of the image sensor and are received at the image sensor; and a processor configured to determine distance information for the one or more objects based on the light signals detected at the image sensor, wherein the image sensor comprises:

a substrate;

a primary sensor element located on and/or in the substrate, the primary sensor element including a first photodetector, where the first photodetector of the primary sensor element includes a photovoltaic junction located at least partially in a germanium-containing material that includes germanium at an atomic percentage greater than 50%; and a secondary sensor element located on and/or in the substrate, the secondary sensor element including a second photodetector, where the second photodetector of the secondary sensor element includes a photovoltaic junction in a second material that includes germanium at an atomic percentage between 0% and 50%, wherein:

the substrate comprises a semiconductor material layer including a first well and a second well both of which are embedded in the semiconductor material layer, the first well comprises the germanium-containing material of the first photodetector of the primary sensor element, the second well comprises the second material of the second photodetector of the secondary sensor element, a first first-conductivity-type semiconductor material region surrounds a bottom surface and side surfaces of the first well, and a second first-conductivity-type semiconductor material region surrounds a bottom surface and side surfaces of the second well.

11. The Time-of-Flight imaging system of claim 10, wherein the second material is a silicon-containing material.

12. The Time-of-Flight imaging system of claim 11, wherein the second material is a silicon-germanium alloy that includes germanium at an atomic percentage between 0% and 50%.

13. The Time-of-Flight imaging system of claim 10, wherein the semiconductor material layer of the substrate comprises a silicon-containing material that includes germanium at an atomic percentage between 0% and 50%.

14. The Time-of-Flight imaging system of claim 13, wherein a gap is located around the lateral side surfaces of the first well so that the germanium-containing material of the first well does not contact the silicon-containing material of the semiconductor material layer of the substrate around lateral side surfaces of the first well, and a silicon-containing capping layer is located over the germanium-containing material of the first well and the gap around the lateral side surfaces of the first well.

15. A Time-of-Flight imaging system, comprising:
an illumination unit configured to emit light signals;
an image sensor that detects the light signals from the illumination unit that are reflected from one or more objects in a field-of-view of the image sensor and are received at the image sensor; and
a processor configured to determine distance information for the one or more objects based on the light signals detected at the image sensor, wherein:
the image sensor comprises an array of sensor elements, each sensor element including a photodetector and a sensing circuit, and the array includes a plurality of primary sensor elements and at least one secondary sensor element, where each primary sensor element comprises a first photodetector comprising a well comprising a first semiconductor material embedded a substrate, each first photodetector comprising a first photovoltaic junction that is formed at least partially in the first semiconductor material, and each secondary sensor element comprises a second photodetector comprising a second semiconductor material that is different from the first semiconductor material, each second photodetector comprising a second photovoltaic junction that is formed in the second semiconductor material, and a total number of primary sensor elements in the array of sensor elements is greater than a total number of secondary sensor elements in the array of sensor elements, wherein the well further comprises a diffusion region comprising dopants of a first conductivity type extending along lateral sidewalls of the well between an upper surface and a bottom surface of the well.

16. The Time-of-Flight sensor of claim 15, wherein the second semiconductor material comprises at least one of a silicon-containing material having less than 50 at % of germanium, magnalium spinel carbon, yttrium oxide, and al-oxynitride.

17. The Time-of-Flight imaging system of claim 1, further comprising:
a semiconductor material liner comprising a silicon-containing material that includes germanium at an atomic percentage between 0% and 50% located between the bottom surface and the side surfaces of the first well and the first-conductivity-type semiconductor material region.

18. The Time-of-Flight imaging system of claim 10, wherein the first first-conductivity-type semiconductor material region and the second first-conductivity-type semiconductor material region have a thickness of 1000 nm or less, the second first conductivity-type semiconductor material region contacts the second well, and the first first-conductivity-type semiconductor material region is separated from the first well.

19. The Time-of-Flight imaging system of claim 15, further comprising:
a silicon-containing capping layer over the upper surface of the well and directly contacting diffusion region.

20. The Time-of-Flight imaging system of claim 15, wherein a first-conductivity-type semiconductor material region surrounds a bottom surface and side surfaces of the well, and the first-conductivity-type semiconductor material region and the diffusion layer extending along the lateral sidewall of the well are separated by a gap having a width of about 0.5 nm.

* * * * *